United States Patent
Crosbie et al.

(10) Patent No.: US 7,099,866 B1
(45) Date of Patent: Aug. 29, 2006

(54) METHOD OF GENERATING AND PRESENTING KERNEL DATA

(75) Inventors: Mark Crosbie, San Jos, CA (US); Rosemari Shepley, El Granada, CA (US); Norman Lamont Jones, Ft. Collins, CO (US); Leonard Frayman, Redondo Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 09/987,912

(22) Filed: Nov. 16, 2001

(51) Int. Cl.
*G06F 7/00* (2006.01)

(52) U.S. Cl. .......................... 707/9; 707/102

(58) Field of Classification Search .................... 707/1, 707/2, 9, 200, 204, 100, 102; 705/1, 30; 710/260, 1, 3, 5, 33; 712/220, 225, 227, 712/233, 200; 718/1; 726/22, 23, 24, 25; 713/164, 165; 709/223–226
See application file for complete search history.

(56) References Cited

U.S. PATENT DOCUMENTS 4,742,447 A * 5/1988 Duvall et al. .................. 718/1
6,105,013 A * 8/2000 Curry et al. .................. 705/65
6,535,855 B1 * 3/2003 Cahill et al. .................. 705/1
6,629,081 B1 * 9/2003 Cornelius et al. ............. 705/30
6,647,400 B1 * 11/2003 Moran ........................ 707/205
2002/0083343 A1 * 6/2002 Crosbie et al. ............. 713/201

OTHER PUBLICATIONS

Aurobindo Sundaram, "An Introduction to Intrusion Detection", 1996, www.acm.org/crossroads/xrds2-2/intrus, pp. 1-10.*

* cited by examiner

*Primary Examiner*—Greta Robinson
*Assistant Examiner*—Harold E. Dodds, Jr.

(57) ABSTRACT

IDDS is implemented as a kernel resident data source which provides per-system call audit records into user space in a timely manner. Each invocation of a system call is audited and a record of the activity is placed into a circular buffer in the kernel. A user-space process reads the data from the buffer via a device driver interface. A device driver provides a clean interface between the kernel and the IDS. The semantics of device drivers are familiar to most UNIX programmers, following the standard file-based open-read-write-close paradigm.

22 Claims, 1 Drawing Sheet

METHOD OF GENERATING AND PRESENTING KERNEL DATA

RELATED APPLICATIONS

The present application is related to co-pending patent application entitled "COMPUTER ARCHITECTURE FOR AN INTRUSION DETECTION SYSTEM", filed Jun. 12, 2001, Ser. No. 09/878,320, and is hereby incorporated by reference into this specification in its entirety.

The present application is related to patent application entitled "COMPUTER ARCHITECTURE FOR AN INTRUSTION DETECTION SYSTEM", filed Jun. 12, 2001, Ser. No. 09/878,319, and is hereby incorporated by reference into this specification in its entirety.

The present application is related to co-pending patent application entitled "Method of Detecting Critical File Changes", and assigned to the instant assignee and filed Nov. 16, 2001, Ser. No. 09/887,911 and is hereby incorporated by reference into this specification in its entirety.

FIELD OF THE INVENTION

The present invention relates generally to intrusion detection systems, and more particularly, to a method and apparatus to provide kernel data that provides per-system call audit records from the kernel into a user space.

BACKGROUND OF THE INVENTION

Intrusion detection data sources provide audit data to determine if an intrusion has occurred. Many previous sources only provided syslog data.

Previous intrusion detection data sources suffered from numerous deficiencies. For example, many sources always produce data, produce ambiguous data, the delivery of data is too slow, negatively impacts system throughput, and stores information from a system call in several records causing difficulty in accessing the records.

SUMMARY OF THE INVENTION

IDDS is implemented as a kernel resident data source which provides per-system call audit records into user space in a timely manner. Each invocation of a system call is audited and a record of the activity is placed into a circular buffer in the kernel. A user-space process reads the data from the buffer via a device driver interface. A device driver provides a clean interface between the kernel and the IDS. The semantics of device drivers are familiar to most UNIX programmers, following the standard file-based open-read-write-close paradigm.

IDDS audit data is read from a device file /dev/idds and audit control commands are written to the kernel by performing ioctl( ) calls on the device file.

The IDDS audit system is enabled at system boot time, but audit data is only generated when the device driver is opened by a user-space process. Minimal overhead is imposed on the system when the /dev/idds device is not opened. Once the device is closed the audit system stops gathering data and flushes all audit records. Records are presented in a binary format to user space, and a library may convert them to ASCII for further processing if required. The user-space library may also provides an interface to enable and control the operation of the audit subsystem.

1. IDDS minimizes the number of copying operations, and only one expensive kernel to user-space copy is required when data is read. All system state is represented in the kernel as a data structure. A kernel data source can provide data in a timely manner an IDS with a minimum of lookup operations.

2. IDDS gathers as much data as possible in the kernel to avoid a race-condition between the creation of an audit record and a query made by the IDS for additional information. Time in the kernel can be considered frozen—the kernel can translate a filename into an inode, and gather information from that inode, safe in the knowledge that no other process is changing that inode at that moment in time. For example, in the case of a file deletion, no further information will be available after the system call has completed, so the desired meta-information about the file must be collected from the kernel inode.

3. IDDS is resilient to subversion by an attacker. To attack a running kernel, an attacker must gain sufficient privilege to load modules into the kernel, or to write to kernel memory via the /dev/kmem interface. While it is certainly possible to alter a running kernel to disable the audit system, such an attack has little chance of success.

4. IDDS is a kernel resident subsystem and is enabled when the system boots. The kernel system call dispatch handler is modified to gather audit data for system calls. Extra code is added to each audited system call function in the kernel to gather data required for the IDS.

5. IDDS splits the per-process overhead of auditing between the process being audited and the IDS reading the records, with data delivery to the IDS performed on the context of the read call to the device driver. This split overhead design ensures proceses running on the system experience a minimal slowdown in system call response time.

6. IDDS will translate a pathname into an inode for any system call which refers to a file.

7. IDDS will gather the meta-information for the file (mode bits, owner uid, owner gid, file type, device, inode number) is read from the inode. The meta-information is crucial to an IDS and is included in every file-related audit record.

8. IDDS resolves relative pathnames into absolute pathnames and the current root directory is prepended to the pathname. The pathname translation code in the HPUX kernel is modified to record the path components accessed as a pathname is resolved into an inode (an internal UNIX kernel data structure). As each component of a pathname is resolved it is stored in a temporary area and is later used to reconstruct the full path for the file.

9. IDDS computes the full absolute path to a file if that file is accessed via a file descriptor. When a file is opened via the open( ) system call, a table is updated in the kernel which records the file descriptor to full pathname mapping. Any accesses to that file by its file descriptor are cross-referenced into the table to find the full pathname for the file.

10. IDDS resolves a symbolic link filename into the full pathname for the target of the link and provides the filename and meta-information for the link target. Resolution of symbolic links takes place in the same routine as pathname resolution identified in item 8.

11. IDDS ensures that the contents of the audit records allow for the deduction of before-and-after states without having to query the system. For example; any audit record for a system call which affects the filesystem contains the file meta-information about the file from before the call. The state of the file after the system call completes can be determined by examining the parameters to the call, the meta-information, and the return value from the system call.

12. IDDS provide a toggle between security and performance. The device driver uses a circular buffer to store audit records to be read by the user-space IDS. When this buffer is full a decision has to be made when an audit record is generated: should the record be dropped or should the kernel wait until space is available in the buffer? If the audit record is dropped then the kernel can return to user-space context immediately, termed non-blocking mode.

13. In blocking mode IDDS will wait until space for the audit record is available in the circular buffer. The process executing the system call will sleep until the space is availavle in the buffer. No audit data will be lost in this mode, but the audited processes may notice an increase in system call response time.

14. IDDS is configured to use blocking mode by default, as performance tests have shown that on average system call performance is minimally impacted.

15. IDDS allows for filtering on system calls, system call outcome and by UNIX user id (UID). For example, IDDS can gather audit information for all open( ) system calls, only successful open( ) calls, or only unsuccessful open( ) calls by user id 123.

Some advantageous features of the IDDS data source according to the present invention are:

1. Configuration flexibility: IDDS supports enable/disable commands which can be issued at any time. When enabled, the IDDS will produce correct reports for all new processes as well as any existing ones.

2. Unambiguous: The contents of the IDDS data stream are parseable by a simple grammar and each record must have a regular structure. The semantics of each record is unambiguous.

3. Timeliness: IDDS delivers data to an intrusion detection system in a timely manner. Delays of even a few seconds could substantially impact the utility of an intrusion detection system. IDDS delivers the data required by an IDS in near-instantaneous fashion.

4. Minimal degradation of system throughput: IDDS data gathering imposes minimal overhead on the running system. If enabling the data source substantially degrades performance, or otherwise impairs normal user behavior, then it is unlikely that users will enable the system.

5. Atomicity: An IDDS record from the data stream stands alone and is semantically and syntactically correct. For instance, if state information about a file is stored separately from the file name, both are records are needed to correctly process the data stream. The loss of one record renders the other useless. IDDS avoids this by storing all required information about a file in the audit record referencing that file.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
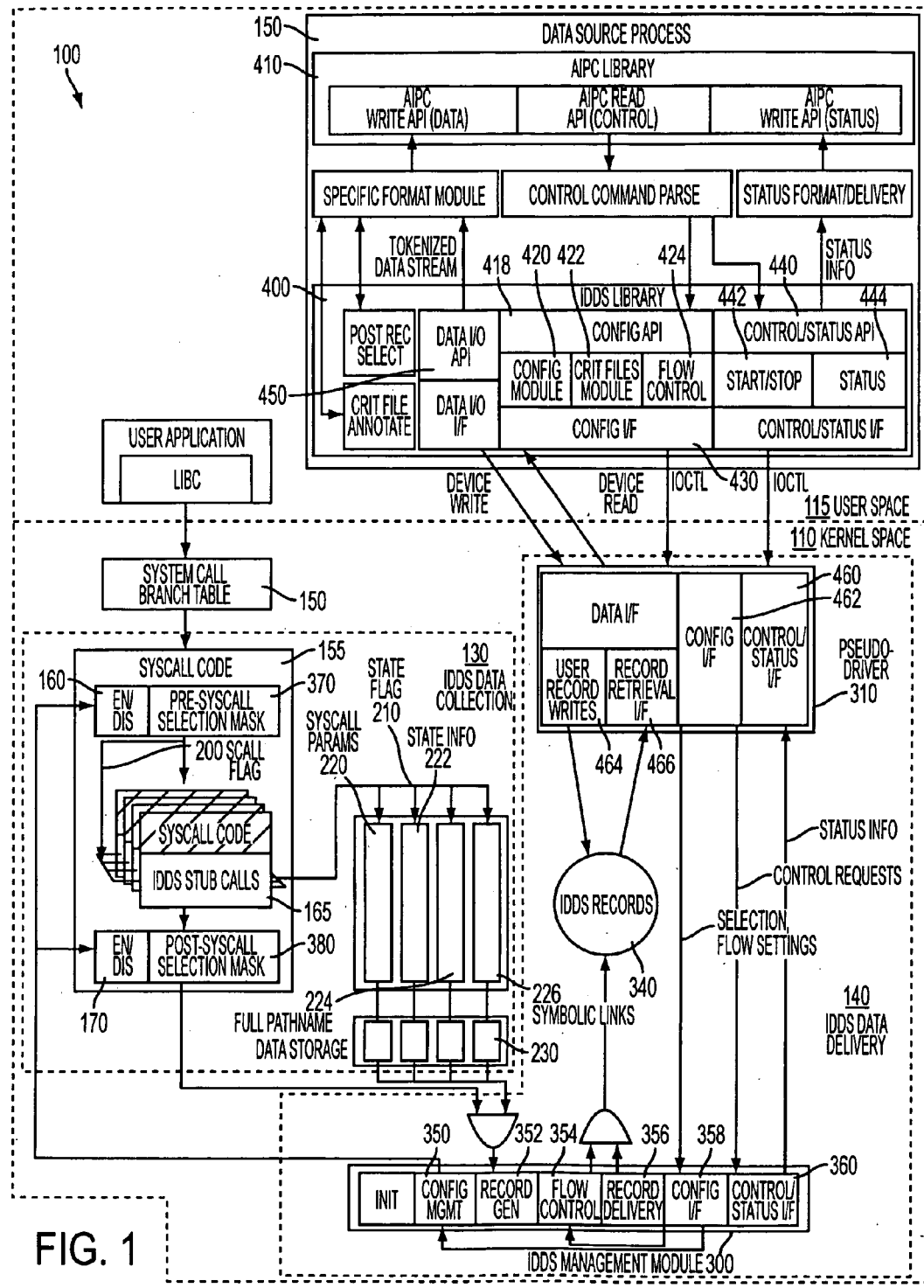
FIG. 1 is a logical architecture of an intrusion detection data source according to the present invention.

Refer first to FIG. 1 where a logical architecture for an Intrusion Detection Data Source (IDDS) 100 illustrates the main components of the IDDS which are discussed in further detail below. Note that the IDDS configuration component is not explicitly boxed in the diagram and are considered sub-components of the data collection, data delivery and user space aspects of the design, rather than a separate component. IDDS 100 is grouped into three main components residing in either a kernel space 110 or a user space 115 on a computer server 90 described in greater detail below. The IDDS 100 is part of an Intrusion Detection System (IDS) described in greater detail in U.S. patent application Ser. No. 09/878,320.

IDDS configuration configures the IDDS 100. The IDDS configuration is a sub-component of the IDDS data collection 130, the IDDS data delivery 140 and the IDS data source process 150. IDDS data collection 130 gathers the required data from the audited system calls. IDDS data delivery 140 generates the audit records and delivers them to user space via a pseudo driver. IDS data source process 150 provides the IDDS data, control, status and configuration interface to the IDS. The steps outlined below briefly describe the configuration and data flow in the IDDS.

1. When the computer server 90 boots up, IDDS 100 may or may not be enabled via unix startup configuration (RC) scripts. IDDS 100 can also be enabled by a privileged user at some later point. However, the correctness or completeness of all IDDS information cannot then be guaranteed if the IDDS 100 is not started during boot.

2. A user configures the IDDS 100 to collect data on various system calls. A system call is a request for kernel services and the only way a process can access the system's hardware. The kernel is at the core of the UNIX operating system. The kernel is loaded into memory at boot-up and manages the system until shutdown. The kernel creates and controls processes, and manages memory, file systems and communications. As depicted in FIG. 1, the user is the IDS data source process 150. The configuration is translated into per process and per system call selection masks by the various IDDS configuration components.

3. Data is collected by the IDDS data collection 130 as configured on a system call basis, but only if the IDDS 100 is enabled. There is a set of mandatory or state related system calls for which data is collected whenever the IDDS 100 is enabled, independent of any specified configuration. These mandatory systems calls are used to maintain state information, e.g., the current working directory of a process.

4. The collected data is formatted into records by the IDDS data delivery 140.

5. The records are delivered to a pre-allocated space within the kernel by the IDDS data delivery 140.

6. The records are retrieved from the pre-allocated space and delivered by a pseudo-driver in response to a read request from the user by the IDDS data delivery 140.

7. Any final formatting and selection of the data is performed within the requesting user process, with the help of IDDS library routines by the IDS data source process 150.

IDDS Data Collection

The IDS system 90 collects kernel data on a per system call basis. When a process within an application issues a system call, a determination is made by the pre-system selection mask code. This determination is made at the beginning of the common system call code in the kernel as to whether a specific instance of a system call should be audited by the IDS 90. That determination is based upon:
1. If the IDDS 100 is enabled.
2. If the IDDS 100 is started.
3. If the process that issued the system call is selected for IDDS auditing.
4. If the system all has been selected for IDDS auditing or the system call is deemed mandatory for maintaining IDDS related state.

As depicted in FIG. 1, there are several components in a system call branch table which have been used in previous UNIX systems and are briefly described herein to facilitate a better understanding of the present invention.

1. System Call Branch Table 150

A system call in UNIX is identified by a unique number greater than termed in the system call number. For example, the HPUX kernel maintains a table which maps each system call number to a pointer to the block of code in the kernel responsible for that system call.

2. Syscall Code Box 155

The syscall code box represents the system call code in the UNIX kernel responsible for executing a particular system call. The code block is pointed to by an entry in the System Call Branch Table.

3. En/dis 160 and Pre-syscall Selection Mask 370

A decision is made before a system call code block executes as to whether or not that call should generate audit data. This decision is based on the system-wide IDDS enabled flag (is the IDDS audit system operational) and the per-system call selection mask which is set when the IDDS audit system is configured. The En/dis box simply indicates that this selection criteria can be Enable and Disabled through the Config Mgmt box. The configuration is updated in response to ioctl( ) commands performed on the /dev/idds device driver by the IDS/9000 system.

4. IDDS Stub Calls 165

As each system call code block executes it will generate data which are relevent to the IDDS system. The IDDS code stubs are points in the system call code where important data elements are gathered and stored for later inclusion in an audit record.

These stub points include code which will keep track of full pathnames, resolve file descriptors to pathnames, track the current working directory and current root directories, and tracking symlink to filename mappings.

5. En/dis 170 and Post-Syscall Selection Mask 380 IDDS has the capability to audit system calls based on their outcome: which can be either success or failure. System calls can be audited if they have a successful outcome, if they fail or irrespective of their outcome. The post-syscall selection mask allows for per-system call auditing based on the pass/fail/both result of the system call.

There are two flags used during a data collection phase to determine what data should be collected. The first flag, referred to as the "scall flag" 200 in FIG. 1 is used to collect data at the beginning, middle and/or end of the system call, as required, to record the appropriate data for later consolidation into a complete audit record for the current system call. The second flag, referred to as the "state flag" 210 in FIG. 1 is used to maintain state, which persists across multiple system calls by auditing mandatory system calls.

Data collection is performed during various stages of the execution of a system call. Some of the data required by the IDS is collected by default in the common system call path, regardless of the IDDS 100 settings. Additional data is either collected by calling IDDS 100 stub routines from individual system call code if the "scall flag" 200 is set or collected in lower level "shared" routines if the state flag 210 is set. The following list specifies in more detail how and where the IDS required data, as shown in FIG. 1, is collected if the state flag 210 is set:

1. System call parameters 220: By default, the system call parameters are stored in a predefined area (the UAREA, not shown in FIG. 1) at the start of a system call, in code that is common to all system calls. The UAREA is part of the HPUX kernel. It stores data about the state of a process in user space in a form required by the HPUX kerne. It is a global data structure in the HPUX kernel. Note, however, that sometimes it is the data the parameters point to in user space and not the parameters themselves that is pertinent for auditing purposes. For instance, for system calls with pathname parameters, a pointer to the pathname is saved, but the pathname itself is not saved in the kernel. For auditing purposes, a pointer to a user-defined pathname buffer is of no interest. Pathnames are actually a special case in terms of storing pertinent data pointed to by system call parameters (see paragraph 3 below). However, other such data is stored from within the individual system calls in a specially allocated IDDS buffer 340. The data is tagged with an identifier and appended to the buffer. The identifier is later used when the audit record is generated.

2. State information 222: Auditing of additional information, beyond the data related to the system call parameters, is required for certain system calls. In particular, system calls that access files also need to provide related file information (file owner, group, etc). This data is collected within the appropriate system calls prior to any modifications that may affect the file information. This allows "previous state" to be collected and analyzed in the event the system call itself results in the modification of the file information. If the system call is successfully executed, the "new state" is already captured in the audited parameters. An IDDS stub routine (idds_vnode_info) is called to perform the actual data collection from within the individual system calls if the scall flag 200 is set.

3. Full path names 224: For system calls with path name parameters, the data needed to generate the complete and unambiguous path name (no symbolic links) of the referenced file(s) is collected. This entails maintaining the root and current working directories for each process. These directories, together with the given path name, constitute the components of the full path name. The full path name information is collected if the state flag 210 is set. The root and current working directories are maintained by performing mandatory auditing of the chroot and chdir system calls for all processes and storing this information off of predefined fields within an IDDS buffer 230. The state flag 210 is always set for these mandatory system calls. The given pathname is collected in low level file lookup routines, again only if the state flag 210 is set. The given pathname is stored off of a predefined field within the IDDS buffer 210, based on a flag set within the individual system call code that denotes what file name parameter (first or second) is currently being processed. For system calls with file descriptor arguments instead of file names, another approach is used. The directory name lookup cache maintained in the kernel is traversed to reconstruct the full path name.

4. Symbolic links 226: For security purposes, it is important to know the full path name of the actual target of a file operation. Therefore, if a given path name (a path name parameter) is a symbolic link to another file, the derived or actual target path name is collected and stored off of a predefined field in the IDDS buffer 230. If the state flag is set 210, indicating that the current system call has path name parameters, the symbolic link data is collected along with the given pathname in the low level file lookup routines.

Following the completion of the individual system call processing, a "post-syscall selection flag" is checked to see if, based on the success or failure of the system call, auditing of the current system call should continue. If so, the IDDS Data Delivery mechanism 140 is invoked to consolidate the collected data into an audit record and deliver it to the audit data consumer(s). Otherwise, the data collected so far is ignored and no further auditing of this particular call is performed. The outcome of a system call to IDDS determines whether or not it is audited. The post-syscall selection mask 380 allows audit of only successful system calls, only failed system calls or system calls irrespective of whether they fail or not.

IDDS Data Delivery 140

The delivery of IDDS data to user space involves two major components of IDDS data delivery 140: an IDDS management module 300 and an IDDS pseudo-driver 310. The IDDS management module 300 actually includes a number of routines that provide the logic between the pseudo-driver 310 and the data collection routines. As described therein, the IDDS management module 300 is described as a portion of the delivery half of the IDDS, even though the IDDS management module 300 also includes the control and configuration interfaces between the pseudo-driver 310 and the remainder of the IDDS system.

The data delivery mechanism 140 is triggered at the end of the system call path by calling the IDDS management routine that generates the audit record, but only if the scall flag 200 for the current system call is set. In this routine, the collected audit data is gathered into a tokenized audit record and deposited into a circular buffer 340 that is shared by the IDDS pseudo-driver 310. If the amount of data in the circular buffer 300 exceeds a pre-defined threshold, or a pre-defined amount of time has elapsed since the last pseudo-driver 340 read, a wake up is issued to the pseudo-driver 310. If the IDS Data Source Process (DSP), the single consumer of IDDS data, has a read pending on the driver, the pseudo-driver 310 will remove a "batch" of audit records from the circular buffer 340 and pass the data on to the DSP data input interface. If no read is pending, the data is delivered when the next read to the psuedo-driver 310 is issued.

Note that data is accessed from the driver via device read, whereas configuration, control and status are accessed via ioctl calls to the driver. A device write is implemented, but not used. This allows trusted applications to generate their own records and insert these records into the IDDS data stream, such that they are delivered together with the system generated IDDS records.

IDDS Management Module 300

The IDDS management module 300 resides in the kernel and contains the functions that interface between the data collected during the individual system calls and the user configurations and data requests issued via the pseudo-driver 310. These functions are identified in FIG. 1 as:

Configuration interface and management 350
Record generation and delivery 352, 356
Flow control 354
Control and status interfaces 358, 360

Configuration Interface and Management 350

The configuration interface 350 maintains system wide configuration related data structures. These structures are updated with user specified configurations. The configuration management is invoked at the start of each system call, in the common system call code, and sets the appropriate selection masks (pre-syscall selection mask 370, post-syscall selection mask 380) based on the settings in the configuration related data structures described below.

Record Generation and Delivery 356

This component gathers the collected data (saved in various locations in the system call path) and formats the data into an IDDS audit record. Tokens are a key component in the generation of records. The generated data, also referred to as a token stream, is then enqueued onto the circular buffer 340 for later retrieval by the IDDS pseudo-driver 310. The pseudo-driver 310 reads the contents from the circular buffer 340 in response to a user issued read to the driver 310.

Each system call for which IDDS 100 is enabled has an associated token list that describes the token stream for the system call. Tokens are definitions of "objects" existing in the current system call context (kernel structures and IDDS state). The tokens represent kernel objects, such as system call number, process id, group id, target filename, etc. Tokens provide a finer granularity of the information available in the kernel. In order to minimize the size of the generated data, tokens are composed to form "composed tokens", where several objects are identified using a single token. The basic tokens are then referred to as "primitive tokens".

Flow Control 354

If a pre-configured minimum data threshold has been reached in the circular buffer 340 or a timeout has occurred, a wakeup is sent to the pseudo-driver 310. If the maximum threshold has been reached (the circular buffer 340 is full) when data is to be delivered, a user-specified action is performed. The options are to sleep until the pseudo-driver 310 clears out some of the space (pseudo-driver sends wakeup to threaded system call), or drop new records until space becomes available.

Control and Status Interfaces

These functions involve starting and stopping (enabling/disabling) system wide IDDS data collection and delivery, setting the flow control options (sleep or drop records), and requesting/collecting status information.

Pseudo-driver 310

All interactions between the user space 115 and the IDDS kernel subsystem 120 (which includes the IDDS data collection 130 and the IDDS data delivery 140) occur via the pseudo-driver 310. Control, configuration, and status requests are supported via the driver's ioctl routine. The pseudo-driver 310 parses the request and calls the appropriate routine within the IDDS management module 300. Status information is returned via the status ioctl request return. A read request is completed when there is enough data in the circular buffer 340 or when a timeout occurs. The read to the pseudo-driver 310 blocks until either of these conditions is met. The pseudo driver 310 then extracts or dequeues data from the circular buffer 340 in the kernel and delivers the data to the process with the pending (or blocked) read.

Root and Current Directories

In order to report full path names of files accessed via a relative name, the root and current directory names of a process must be maintained. The root or current directories are modified as a result of the chroot( ) or chdir( ) system calls, respectively Within a process, root and current directories are shared between all threads. However, there are instances when a thread changes one of the directories while other threads are in the middle of system call processing. To properly handle these cases, root and current directories are maintained on a per process and per thread basis. The per process version is the one that is modified. The thread versions are used for reporting purposes. If these shared values are changed, i.e. the process version of the data is modified, all remaining threads get their values updated when they enter the system call path.

The process and main thread root and current directory names are inherited from the parent process. Newly created threads get their values from a process's current value. The present invention attempts to minimize the amount of memory required to store these directory names. Numerous processes (and corresponding threads) will be able to share the same directory name buffer. For proper handling of usage of this buffer, a reference count for the buffer is maintained. This count is updated under protection of an IDDS specific spinlock. Directory updates are quite rare, so a single global lock will suffice.

If a process issues an fchdir( ) call to change the current working directory of a process, the directory name lookup cache (dnlc) is used to reconstruct the current directory name.

Files Accessed Via File Descriptors

As with the fchdir, file accesses via file descriptors require another method of obtaining the path name. An attempt is made to reconstruct the full path name via the directory name lookup cache.

Path Name Reporting

Path names are reported in components, with the use of tokens. The components of the full path name are:
1) the root directory and the resolved path name argument, if the argument is absolute, or
2) the current directory and the resolved path name argument, if the argument is a relative path name.

IDS Data Source Process 150

The IDS DSP 150 is the primary link between the user space 115 and the IDDS data delivery 140 required for host-based intrusion detection. The IDS DSP 150 for IDDS is an agent or a collection of the intrusion detection processes that reside on the local system. The IDS DSP 150 provides the data, configuration, control, and status interfaces between the IDS DSP 150 and the IDDS 100 as shown in FIG. 1.

The main components of this IDS DSP 150 are:
IDDS library 400 provides APIs and functionality for interfacing to the IDDS as well as further formatting and annotating the IDDS data retrieved from the kernel provides audit data formatting, command and control parsing, and status formatting.
IDS AIPC library 410 provides the APIs and functionality for interfacing to the remainder of the IDS DSP 150.

IDDS Library 400 Functions

The IDDS library 400 provides functions to interface with the IDDS pseudo-driver 310 to obtain data (token streams) and status from the IDDS kernel subsystem 120. The IDDS kernel subsystem 120 includes the IDDS data collection module 130 and the IDDS data delivery module 140. The library also provides functions to format and annotate the token streams..

When the application reads the audit record, it uses the token table to format and deliver the IDDS record to the IDS DSP 150.

Configuration 418

The various configuration requests supported by the IDDS library 400 include:
1. Audit selection (filtering) specifications 420.
Data can be selected based on process, user, group, filename information, and/or time intervals. The IDDS library 400 accepts one or many such configuration specifications in a single call. The process, user, and group selections are passed on the IDDS sub-system 120 via an ioctl call to the pseudo-driver 310. This information is used to set the scall 200 and state flags 210, used by the IDDS 100 to determine whether or not to collect IDDS data. The filename and time interval selections are added to a global IDDS configuration file 430 in user space. This information is used to perform the post-record selection masks on data read from the IDDS system.
2. Critical file list specification (for monitoring hard links) 422.
Unless specifically monitored, it is impossible to detect when files are accessed through alternate file names via hard links. The IDDS library 400 supports the notion of a critical file list, where hard link accesses to given files can be monitored. The cricital files are stored and maintained in a global IDDS configuration file in user space. This list of files is referenced during the annotation phase, after data is received from the IDDS psuedo-driver, such that any hard link accesses to any of the given critical file can be detected and flagged in the IDDS record.
3. Flow control settings 424.
The circular buffer 340 that contains the IDDS records in the kernel 110 may fill up to the point where new records cannot be placed onto the buffer. When this occurs, some type of flow control must go into effect until the pseudo-driver 310 is able to read (remove) records from the buffer and make room for additional records. Two flow control methods are selectable by the IDS administrator, as the two methods have performance and security tradeoffs. The options are to "sleep" or "drop records" until space becomes available. The IDDS library 400 provides a function that sets this flow control setting in the IDDS system, via an ioctl command to the IDDS pseudo-driver 310. The default flow control setting is to sleep the process attempting to write to the buffer when it's full.

Control 440

The IDDS library 400 supports a control function with the following control options:
1. Start 442.
This option starts up the IDDS system 100. An ioctl command is issued to the pseudo-driver 310, which in turn enables the system-wide IDDS flag is part of the pre-syscall selection mask. The existing selection masks go into effect when the IDDS system is started.

This option has no effect if the IDDS system is already enabled. Also, full pathname information may be lost if the IDDS system is not started up during boot.

2. Stop 442.

This option stops the IDDS system. An ioctl command is issued to the pseudo-driver 310, which in turn disables the system-wide IDDS flag. No audit records are generated once the IDDS system 100 is stopped. This option has no effect if the IDDS system is already disabled.

3. Status Requests 444.

This option returns status information about the IDDS 100. An ioctl command to the IDDS pseudo-driver 310 with the appropriate status request parameters. The status data is returned in a user-specified buffer, defined as one of the parameters, at the completion of the ioctl call. The status information includes IDDS system state such as number of pending audit/IDDS records in the kernel, number of reads to the pseudo-driver, and number of sleeps that occurred during a given time frame.

Data I/O 450

Data is obtained from IDDS by calling a library routine that reads from the appropriate IDDS pseudo-driver device file.

Reads will block if there is not sufficient data available in the kernel's circular buffer 340. The block size returned is between a minimum and maximum threshold, unless a timeout occurred due to lack of data, in which case all existing records are returned, which will then be less than the minimum threshold.

The data contained within each record is tagged. More specifically, data fields are prepended with associated tokens.

The record data formats are defined by tokens delivered together with the data. Data elements are tagged or prepended with tokens that define the contents of the data field.

Major Modules

The following modules are implemented within the IDDS kernel subsystem 120 and the IDDS pseudo-driver 310.

Configuration/Control/Status 460 idds_enable( )

This function is called during early boot to enable the pseudo-driver 310 to start collecting state relevant data. Data collection routines that maintain state are required to start during system boot in order to maintain the correct state throughout system uptime. The state information is collected and maintained for all processes, regardless of whether or not the process is currently selected for IDDS audit. This is due to the fact that the state information is context sensitive and must be collected over time. This routine sets or clears the system wide global IDDS enable flag. If this flag is not enabled during boot, a reboot is required to enable IDDS.

idds_start( )

This routine is called by the pseudo-driver 310 at the request of a user to set or clear the system wide IDDS started flag. This flag determines whether or not any IDDS records are generated, providing the global IDDS enable flag is set. Unlike the enable flag, the user can toggle the setting of the IDDS started flag during system uptime, starting or stopping the flow of IDDS data to the configured location(s).

idds_config( )

IDDS selection criteria, what processes and what system calls to generate IDDS records for, is initialized by calling this routine. The routine is called by the IDDS pseudo-driver 310 as the result of an IDDS library configuration call. The configuration information is maintained in the IDDS kernel subsystem in two separate global structures, an IDDS per process selection table and an IDDS system call table. The IDDS system call table (not shown) in part of the system call branch table 150.

idds_setup( )

This function implements the pre-syscall selection level. It sets the IDDS specific per process (if needed) and per thread flags for each system call, providing the global IDDS started flag is set. The function is called at the start of the common system call path. Once a per thread IDDS flag is set, IDDS data collection is enabled for the entire system call, regardless of any changes to the global IDDS started or enable flag for the duration of the system call.

idds_scall( )

This is a macro called during individual system call code segments to determine whether IDDS is enabled (selected) for the current system call thread.

idds_state( )

This is a macro called from the low level data collection routines to determine if data should be collected. The macro factors in two settings: the per thread selection flag (returned by the idds_scall( ) macro), and whether or not the current system call state flag is set, indicating that data must be collected for this call to maintain state. If either flag is set, the macro returns true.

idds_scallerr( )

This function implements the post-syscall selection level. It is called at the completion of an individual system call to determine whether IDDS auditing is enabled for the system call error return.

Data Collection

There are a number of major modules that support data collection. Most of the data collection involves the collection of current and root directory names for a given process and the associated threads.

Record Generation

The idds_gen_record( ) routine is called at the end of the system call path if the selection flag in the IDDS per-thread structure is enabled. This routine builds token streams by obtaining the required tokens from the token list for the current system call and using the tokens to retrieve current values from appropriate kernel and IDDS structures. The token streams consist of data elements preceded by associated token IDs (primitive or composed). A composed token ID contains data elements associated with multiple primitive tokens. Once the token stream or record is generated, this routine queues the record onto the circular buffer 340 shared with the pseudo-driver 310.

Various token management routines are provided to create tokens, both primitive and composed, and provide the system call to token and token to collected data mappings.

Pseudo-Driver 310

The main modules in the pseudo driver 310 consist of the standard install, open, read, write, ioctl, and close routines typically found in pseudo-driver 310. To a large extent, the pseudo-driver is simply a pass-through driver that copies and forwards request from user space 115 to the appropriate IDDS kernel routine, and reads and delivers the generated audit records or token streams from the IDDS subsystem 120 to user space 115. The pseudo-driver 310 interfaces can be categorized into control/initialization 460, configuration 462, record delivery 464, 466 and status 460.

IDDS Library 400

The IDDS library performs the final selection/filtering of IDDS audit records.

Major Data Structures

IDDS System Wide Control Structure

This IDDS system wide control structure contains the IDDS "enabled" and "started" flags, and pointers to per process and per system call IDDS configuration tables.

IDDS Process Configuration Table

This IDDS process configuration table structure contains linked lists of UID, and GID used to generate the IDDS per process flag.

IDDS System Call Configuration Table

This IDDS system call configuration tablestructure contains system call and associated system call error return selections. This information is used to generate the IDDS per thread flags. This table also contains a token list that defines what data to collect and how to format the data for any given system call.

IDDS Per Process Data Structure

This IDDS per process data structure contains the IDDS per process flag generated from the IDDS process selections specified in the above mentioned process configuration list. The per process data structure also contains pointers to state pertaining to the process, such as the root and current working directories.

IDDS Per Thread Data Structure

This IDDS per thread data structure contains the IDDS per thread flags generated from the IDDS per process flag and the system call selections specified in the above mentioned IDDS system call configuration table. The IDDS per thread data structure also contains state relevant to the thread, such as system call arguments that are specifically saved by IDDS, pointers to root and current directory names, and other associated state information.

IDDS Token Tables

The following structures maintain information required for the token stream generation:

IDDS System Call Table: This table maintains per system call relevant IDDS information, including the token lists that define the associated token stream.

Token Type Structure: This structure defines the types and sizes of all defined primitive tokens. The size of the token is bound to its type. This structure is also used in user space in the IDDS library to interpret and extract data in the token stream.

(Primitive) Token Structure: Defines an enumerated variable of token ids and array of tokens type, size and getvalue function of every primitive token in the Kernel, indexed by the token_id enumerated variable. This structure is also used in user space in the IDDS library to interpret and extract data in the token stream.

Composed Token Structure: This structure contains the definitions of the composed tokens. The composed token IDs index into an array of primitive token lists. This structure is also used in user space in the IDDS library to interpret and extract data in the token stream.

IDDS Record Generation Table: This table preprocesses the previous tables and creates specific orders for record generation for every audited system call. Exception Conditions The following considerations are applicable to each of the IDDS modules:

All routines dealing with input parameter ranges check for boundary conditions.

All accesses to vnode pointers and like are checked for NULL before use.

Error returns are handled in all IDDS resource (memory) allocations.

Appropriate locking orders prohibit race conditions.

Detailed Design

First, the data structure(s) design is presented followed by the module design(s).

Data Structure Design

System-Wide IDDS Control Structure (idds_control)

The idds_control structure is a system-wide IDDS relevant control structure that contains the global IDDS enable flag, the IDDS "on" flag, a pointer to the IDDS system call table (which in turn contains system call selection criteria) and a pointer to the IDDS process selection criteria. The two last structures are described in more detail below.

This control structure is really a collection of distinct global audit variables and structures that can be individually locked. These global audit variables are contained within a single structure for coherence and maintainability. As such, access to this structure is semaphored based on usage. The following data structure describes the contents of the idds_control structure.

```
struct idds_control {
    lock_t *lock;
    int enabled;
    int started;
    int mode;
    idds_procselect_t * idds_procselect;
    idds_scall_t *idds_scalls;
} iddscontrol;
```

TABLE 1 idds_control Data Structure Elements

| Element | Description |
|---|---|
| lock | This lock must be obtained when modifying fields in the idds_control structure after the structure has been initialized. This means that the lock is only needed when changing the audit_enabled flag setting, since the idds_enabled, idds_procselect and audscall fields are not modified once initialized. |
| enabled | This is the system-wide IDDS flag that pertains to all data collection and data delivery. The "enable" flag determines if the system is able to support IDDS. No IDDS auditing is performed if this flag is not set to 1, regardless of the IDDS started flag and other IDDS configuration settings. Data collection routines that maintain state are required to start during system boot in order to maintain the correct state throughout system uptime. These routines use the IDDS enabled flag to initiate saving state. If this flag is not enabled during boot, a reboot is required to enable IDDS. |
| started | This system-wide "started" flag determines whether or not per system call data collection (data collection that does not span multiple system calls), record generation, and record delivery are performed. |

TABLE 1-continued idds_control Data Structure Elements

| Element | Description |
|---|---|
| | Unlike the enable flag, the user can toggle the setting of the idds_on flag during system uptime, starting or stopping the flow of IDDS audit data to the configured location(s). If IDDS auditing is turned on by default during system startup (specified in an IDDS system configuration file), then this flag is set to 1 in the IDDS initialization routine. Otherwise, the flag is initialized to zero. |
| mode | This flag determines what mode the user has selected for handling the full buffer event, where generated IDDS records cannot be placed in the circular buffer shared between the IDDS subsytem and the IDDS pseudo-driver. Valid flag settings are IDDS_MODE_DISCARD (for simply dropping records) and IDDS_MODE_SLEEP (for sleeping until a timeout or wakeup occurs). |
| idds_procselect | This is a pointer to the process related configuration table, which includes UID and GID selections. This is a statically assigned pointer. The table contents are described below. |
| idds_scalls | This is a pointer to the per system call related information, which includes the selection criteria and the IDDS record format (via token definitions) associated with each IDDS audited system call. This is a statically assigned pointer. This structure is described below. |

IDDS Process Configuration Table (idds_procselect)

The idds_procselect table is an array of pointers to linked lists of selection settings that are used to generate the IDDS per process flags. The array itself is statically allocated. The link elements are dynamically created and the array elements are initialized when the user specifies the selection criteria. The following data structures describe the contents of this table; the link list element structure and the array of pointers:

```
typedef struct idds_pselect {
    union {
        uid_t uid;
        pid_t gid;
        int   dat;
    } u;
    unsigned short token_id;
    struct idds_pselect *next;
} idds_pselect_t;
typedef struct idds_procselect {
    lock_t *lock;
    idds_pselect_t *list;
    int all;
} idds_procselect_t;
```

TABLE 2 idds_pselect_t Data Structure Elements

| Element | Description |
|---|---|
| uid | UID value selected (member in union field) |
| gid | GID value selected (member in union field) |
| dat | Generic access to select value (member in union field) |
| token | Token ID that identifes contents of dat field. |
| next | Pointer to next element in the list. |

TABLE 3 idds_procselect Data Structure Elements

| Element | Description |
|---|---|
| lock | Lock protecting the audprocfilter table against simultaneous updates and accesses during updates. This lock will support single write and multiple reads. If performance becomes an issue (during filter updates), this lock can be divided into per link list locks to minimize lock contention. |
| list | An array of structures, each containing a pointer to a linked list containing select information of a specific type (UID or GID). |
| all | The all flag indicates that all users or groups (i.e. all processes) are selected. This field takes precedence over the linked list. In other words, if the all flag is set, the link list is removed and the list pointer is set to NULL. |

IDDS Path Name Data Structures

The following data structures are used to store path name related information.

```
typedef struct {
    char  *path_name;
    int    path_name_len;
} idds_path_name_t;
typedef struct {
    int             ref_count;
    struct idds_path_name dir_name;
} idds_dir_name_t;
```

TABLE 4 idds_path_name_t Data Structure Elements

| Element | Description |
|---|---|
| path_name | Pointer to a memory buffer containing the path name. All path names (for path name arguments, root, and current directories) are stored in this structure. |
| path_name_len | Length of path name |

TABLE 5 idds_dir_name_t Data Structure Elements

| Element | Description |
|---|---|
| ref_count | The number of references to the directory name. |
| dir_name | The path name data (path name string and length) for a root or current directory name. |

IDDS File Information Data Structure

The following structure is used to store information pertaining to the given vnode for a file (path name):

```
struct idds_vnode_info {
    enum vtype  type;
    int32_t     nodeid;
    int32_t     device;
    short       mode;
    uid_t       uid;
    gid_t       gid;
}
```

| Element | Description |
| --- | --- |
| type | The type of the file (FIFO, character, block, etc). |
| nodeid | This is a file system specific number (i.e. inode number for ufs) which uniquely identifies a file within a file system. |
| device | File system ID (dev for now) |
| mode | File access mode bits |
| uid | User ID of the file owner |
| gid | Group ID of the file owner |

IDDS Per Process Data Structure

The IDDS per process data structure contains configuration flags and pointers to root and current directory names. The data structure is allocated and initialized during process creation, and deallocated when the process exits.

The IDDS per process structure contains the following fields:

```
typedef struct {
    lock_t *lock;
    int selected;
    int inherited;
    int recalc;
} idds_proccfg_t;
struct idds_proc_block {
    idds_proccfg_t flags;
    struct idds_dir_name *proc_root_dir;
    struct idds_dir_name *proc_current_dir;
}
```

TABLE 6 idds_proccfg_t Data Structure Elements

| Element | Description |
| --- | --- |
| lock | This lock is used when updating the recalc bit. It will support single write and multiple reads. |
| selected | Indicates whether or not this process is selected for IDDS audit. |
| inherited | Indicates whether or not the selected flag setting was inherited from the parent process. |
| recalc | Flag indicating whether or not the IDDS per process flag needs to be recalculated (from the IDDS process and system call configuration tables) at the start of a new system call. |

TABLE 7 idds_proc_block Data Structure Elements

| Element | Description |
| --- | --- |
| flags | Configuration flags used to determine if IDDS data should be collected for this process. |
| proc_root_dir | A pointer to the path name structure of the process' root directory. Updates to this field are protected by sched_lock. |
| proc_current_dir | A pointer to the path name structure of the process' current directory. Updates to this field are protected by sched_lock. |

IDDS Per Thread Data Structure

The IDDS per thread data structure contains configuration information, pointers to root and current directory names, path name arguments and associated derived pathnames (if the argument contains symbolic links), file state information, and other IDDS relevant system call arguments not stored elsewhere in the kernel. The data structure is allocated when a new thread is created, initialized before each system call (with the exception of root and current directory fields, which are initialized at thread creation time), used to store IDDS specific data during the system call, and then freed when a thread is released. No locks are required since this structure is updated only within a current thread.

The IDDS per thread structure and associated data structures contain the following fields:

```
typedef struct {
    ushort   scall;
    ushort   state;
} idds_threadcfg_t;
typedef struct {
    caddr_t data;
    int len;
    unsigned short token_id;
} idds_token_stream_t;
struct idds_thread_block {
    idds_threadcfg_t flags;
    struct    idds_dir_name     *kt_root_dir;
    struct    idds_dir_name     *kt_current_dir;
    unsigned short              which_path;
    unsigned short              dnlc_flag;
    struct    idds_path_name    argument_path_name[2];
    struct    idds_path_name    symlink_path_name[2];
    struct    idds_vnode_info   vnode_info[2];
    struct {
        idds_token_stream_t tokens[MAX_SYSCALL_TOKENS];
        unsigned short      next_token;
    } misc_tokens;
}
```

TABLE 8 idds_threadcfg Data Structure Elements

| Element | Description |
| --- | --- |
| scall | Flag indicating whether or not IDDS is enabled and IDDS audit is turned on for thread. |
| state | Flag indicating whether the current threaded system call is a mandatory system call. |

TABLE 9 idds_token_streams_t Data Structure Elements

| Element | Description |
| --- | --- |
| data | A pointer to the collected data, which is either a complex argument (a string or struct that involves a copyin( ) from user space) and computed values that don't linger in a global location elsewhere in the kernel. Space is allocated as needed. |
| len | Length of collected data (in bytes) |
| token_id | A token ID defining the data contents. |

TABLE 10 idds_thread_block Data Structure Elements

| Element | Description |
| --- | --- |
| flags | Flag indicating whether or not IDDS audit is enabled and turned on for this thread. |
| kt_root_dir | A pointer to the path name structure of the thread's root directory. No lock is required for updates to this field, since updates are performed by only by the current thread. |

TABLE 10-continued idds_thread_block Data Structure Elements

| Element | Description |
|---|---|
| kt_current_dir | A pointer to the path name structure of the thread's current directory. No lock is required for updates to this field, since updates are performed by only by the current thread. |
| which_path | Some of system calls may have 2 path name arguments. This flag determines which path name argument is currently being processed. |
| argument_path_name | An array of two path name structures (one for each possible path name argument) used to store the system call path name arguments. |
| symlink_path_name | An array of two path name structures used to resolve symbolic links (if any) for the given path name arguments. |
| vnode_info | Vnode information structures that contain IDDS relevent information about vnodes corresonding to file related parameters (maximum two). |
| tokens | An array the size of a maximum number of "misc" tokens. The array elements contain IDDS relevant data which is not stored elsewhere in the kernel. |
| next_token | Next available slot in tokens array. |

IDDS System Call Configuration Table

This structure is a system wide IDDS system call configuration table. The IDDS system call configuration table contains information on whether or not to collect data for a system call. It also includes formatting information, how to build an IDDS record for the given system call. The following structure is used to maintain this information in the IDDS system call table:

```
#define IDDS_MAXTOKENS 8
typedef struct {
    lock_t *lock;   /* may not need be required */
    struct {
        int selected;
        int state;
        int rnterr;
    } flags;
    int tokens [IDDS_MAXTOKENS];
    int (*build_stream) (void *ptr, size);
} idds_scall_t;
```

The following table contains an entry for every system call. If no tokens are specified and the system call is selected for IDDS audit, only the IDDS header information, included by default for all system calls, is added to the token stream.

For readability, this structure does not contain all token types

```
idds_scall_t idds_scalls[IDDS_MAXSCALLS] = {
    /* IDDS_MAXSCALLS contains extra space for future syscalls */
    ...
    /* open */
    {1, 0, PASS, IDCT_HEADER, IDT_FNAME1, IDTNNAME2,
IDT_DEV, IDT_NODE, 0, 0, 0, NULL};
    ...
}
```

TABLE 11 idds_scall_t Data Structure Elements

| Element | Description |
|---|---|
| lock | Probably okay if update during read. Just miss filtering change until start of next system call. This is only true if single writer. |
| selected | Flag indicating whether or not the system call is selected for IDDS audit. |
| state | Flag indicating whether or not the system call |
| rnterr | This field contains the configurable setting used to evaluate the system call error return (PASS, FAIL, BOTH, NONE). This field is updated via an ioctl call to the IDDS pseudo-driver. |
| tokens | An array of up to MAX_TOKENS tokens defining the data to be copied into the token stream for the system call associated with the scall_table entry. The token list must be delimited with the IDT_DELIM token. |
| build_stream | This is a function entry point for those system calls that have been changed or added to the system. The function pointer can be initialized after boot and used by system calls that require special access to newly created structures that were not previously defined in IDDS. If NULL is specified, the default record generation routine design for the token is used. |

IDDS Token Definitions

The token definitions are contained within three structures: token types, primitive token definitions, and composed token definitions.

For backward compatibility, token definitions cannot be deleted. If the contents of a composed token have to be modified, a new token will be added and delivered with the old tokens. This allows old and new applications to use the same token stream, even if new data is added; old applications will ignore unknown tokens, and new applications can take advantage of newly added tokens.

Composed tokens only contain tokens with tokenID's smaller than its tokenID. This avoids cycles and recursive definitions. Required checks must be implemented.

Token Types

Token sizes are defined in a types array indexed via a token type ID. The token type structure contains the size in bytes of the values for a given token type. A zero value denotes a variable size type. By convention, any variable size element contains its size in the first two bytes of the data element following the associated token ID in the token stream. Token type ID variable names are prefixed by IDTT_.

The following structures define the token type IDs and token type array elements. For readability, the complete set of token IDs and token types are not defined here.

```
unsigned short enum idds_type_id = { IDTT_INT, IDTT_LONG,
IDTT_STRING, < rest of types> };
typedef struct idds_type {
    unsigned short size;
    /* TBD - other type information? */
} idds_type_t;
idds_type_t idds_types[ ] = {
                    { sizeof(int) },
                    { sizeof(long) },
                    { 0 /* variable */},
                    < rest of types > };
```

TABLE 12 idds_type_t Data Structure Elements

| Element | Description |
|---|---|
| size | Size of the token in bytes. If the token size is variable, this field is 0 and the first integer of the data contains the size of the data. Special case: strings (IDT_STRING) are '/0'-delimited and don't require a size field. |

Primitive Tokens

This structure maintains definitions of primitive tokens. This is a statically allocated array. The array itself is automatically generated from an idds_tokens.def file, containing descriptions of the array elements. Every token contains a token ID, which is used to index into an array of token definitions. The token definition consists of a name, the token type, and a get value function for extracting its value from the current system call context. The contents of the array, with the exception of the dynamic get value functions are statically defined (at compilation time). Static tokens implement the get value function in code, so the get value field in the token definition is NULL. For tokens added dynamically, the get value function is provided by DLKM and set during DLKM initialization. The mapping of tokens to current values in memory is implemented when the token stream is created. The name is used for formatting purposes in user space.

Primitive token ID variable names are prefixed by IDT_. Primitive token ID values start at 1 and end at 9999 (MAX_IDT_TOKEN).

The following structures define the contents of the primitive token array. For readability, all token IDs and token definitions are not included here.

```
unsigned short enum idds_token_id { IDT_UID = 1, IDT_GID,
IDT_TIME, NUM_IDT_TOKENS};
typedef struct idds_token {
    char *name;
    unsigned short type;
    void *(*get_value) ( );
} idds_token_t;
idds_token_t idds_tokens[ ] = {
        {"UID", IDTT_INT, NULL},
        {"GID", IDTT_INT, NULL},
        {"TIME", IDTT_LONG, NULL}
    <rest of primitive tokens >
};
```

TABLE 13 idds_token_t Data Structure Elements

| Element | Description |
|---|---|
| name | This field contains the name of the token. This is used for automatic translation to ASCII audit records, or for debugging. |
| type | The token type ID is used to index into the idds_types array, which contains the size (in bytes) of the token. |
| getvalue | This is a function pointer used only for dynamic tokens (those loaded via DLKM to support new system calls or IDDS extensions). This field is set to a NULL value for predefined tokens. For performance reasons, these known getvalue functions are implemented in a single routine within a switch statement accessed by the token ID. This allows multiple fields to be processed within a token stream without the overhead of multiple function calls. |

Composed Tokens

Composed token definitions consist of a list of multiple primitive tokens. A composed token is used to consolidate separate types of data that are often bundled together for reporting purposes. For example, the IDDS record header is defined via a composed token, since this data set is common to all reported IDDS records.

This array is statically allocated. The array itself is automatically generated from an idds_tokens.def file, containing descriptions of the array elements.

Composed token ID variable names are prefixed by IDCT_. Composed token ID values start at 10,000 (MIN_IDCT_TOKEN) and end at MAX_IDCT_TOKEN.

The following structures define the contents of the composed token array. For readability, all composed token definitions are not included here.

```
unsigned short enum idds_comp_token_id {MIN_IDCT_TOKEN =
IDCT_HEADER = 10000, IDCT_FILE1, IDCT_FILE2, NUM_IDCT_TOKENS};
typedef struct idds_comp_token {
    char *name
    unsigned short members[16];
} idds_comp_token_t;
idds_comp_token_t idds_comp_tokens [IDDS_MAX_COMP_TOKENS] = {
    {"IDCT_HEADER",  IDT_TS, IDT_PID, IDT_ERR, IDT_SCALL, IDT_PPID,
                     IDT_AID, IDT_UID, IDT_GID, IDT_EUID, IDT_EGID,
                     IDT_TTY, IDT_RET1, IDT_RET2, IDT_GIDS, 0 },
    {"IDCT_FILE1",   IDT_GIVENFN1, IDT_DERIVEDFN2, IDT_FMODE2,
                     IDT_FUID2, IDT_FGID2, IDT_FINODE2, IDT_FDEV2,
0 },
    <rest of composed tokens>
};
```

TABLE 14 idds_comp_token_t Data Structure Elements

| Element | Description |
|---|---|
| name | This field contains the name of the token. This is used for automatic translation to ASCII audit records, or for debugging. |
| members | A list of token members, delimited by the IDT_DELIM token. Note that all member ID values must be < than the composed token ID value. |

The following variable is used for future updates to the composed token table. This variable is calculated during system startup. Insertion of new tokens must check for the upper boundary of the allocated idds_comp_tokens array (index MAX_COMP_TOKEN). The population of extended composed tokens will be implemented in user space via an extended composed token definition file and loaded into the end of the idds_comp_tokens array via ioctl( ) calls.

```
int idds_tokens_next_available =
    idds_comp_tokens [NUM_IDCT_TOKENS- MIN_IDCT_TOKEN];
```

Status Collection

IDDS relevent status information gathered in the kernel is maintained in the idds_status structure. Modifications to this structure are serialized by using the IDDS_STATS_LOCK spinlock.

```
struct idds_stats {
    ulong  total_bytes;      /* total bytes written */
    ulong  total_recs;       /* total records written */
    ulong  read_count;       /* number of device reads */
    ulong  highest_offset;   /* maximum audit buffer depth */
    ulong  buffer_sleep;     /* count of audit space sleeps */
    ulong  timeout_cnt;      /* count of audit timeouts */
    ulong  disc_rec_cnt;     /* count of discarded records */
    ulong  syscall_sleeps;   /* count of discarded records */
};
```

| Element | Updated By | Description |
|---|---|---|
| total_bytes | Data Collection Routines | total number of bytes written into the circular buffer. |
| total_recs | Data Collection Routines | total number of records written into the circular buffer. (TCB writes + syscalls) |
| read_count | Pseudo-driver | number of performed reads (by the audit daemon). |
| highest_offset | Data Collection Routines | maximum audit buffer depth (maximum number of bytes used in the circular buffer at any time) |
| buffer_sleep | Pseudo-driver | number of audit spaces sleeps (pseudo-driver forced to sleep because size of circular buffer < minimum required byte count) |
| timeout_cnt | Pseudo-driver | number of times the timeout was triggered (returning existing data because minimum required byte count not reached with in configured timeout) |
| disc_rec_count | Data collection rotuines | number of discarded records by the fast audit system due lack of available space in the circular buffer. Only valid if flow control "discard" option selected by the user. |
| syscall_sleeps | Data collection rotuines | number of syscalls forced to sleep because the circular buffer is full. Only valid if flow control "sleep" option selected by the user. |

Module Design

Control/Configuration Routines

Each of the major modules related to IDDS control and configuration of the IDDS subsystem are discussed in further detail in this section.

idds_enable

This routine simply sets or clears the idds_control.enabled flag, based on the given input flag parameter. The routine returns an error (IDDSERR) if the input flag already equals the current enabled flag setting. This routine is called during system boot. A call at any other time will result in an error, since IDDS state cannot be maintained correctly if not started during boot.

idds_start

This routine simply sets or clears the idds_control.started flag, based on the given input flag parameter. The routine returns an error (IDDSERR) if the input flag already equals the current started flag setting. This routine is called at the request of a user (the IDDS library 400) via the IDDS pseudo-driver 310. If the started flag is set to 1, IDDS records are generated for selected system calls and processes (specified via idds_config). If the started flag is cleared to 0, no IDDS records are generated.

idds_mode

This routine simply sets or clears the idds_control.mode flag, based on the given input flag parameter (IDDS_MODE_DISCARD or IDDS_MODE_SLEEP). The routine returns an error (IDDSERR) if the input flag already equals the current mode flag setting. This routine is called by the IDD library via the IDDS pseudo-driver.

idds_config

This function is called by the IDDS pseudo-driver 310 in response to a configuration request from the user. The configuration information is formatted and stored in internal IDDS configuration data structures. The information is later referenced during system call execution.

This routine initializes and/or updates the system-wide audit configuration tables that contain IDDS selection criteria as specified by the user. These tables are later used to set the appropriate audit flags during audit operations.

All configuration/filtering requests pass through the pseudo-driver 310 from the audit daemon. Only those tokens corresponding to supported kernel filters are passed to this routine. Some additional filtering information, i.e. other filter tokens along with associated filter data, is maintained in the audit daemon, and additional filtering is then performed in the audit daemon during the post-filtering phase.

The specified action pertains to all parameters. If different actions are required, additional calls to the audit_config routine are also required.

This routine can be called independent of the system-wide IDDS started flag setting. However, the selection critieria does not go into effect until the IDDS subsystem is started.

Pseudocode:
/* Verify parameters */
Check for valid token, valid action, valid dat1 value, if applicable and possible (e.g. if syscall, make sure in syscall number range), and valid dat2 value, if applicable
If invalid parameter found
return IDDSEPARM
/* Perform any global actions on configuration table */
If (action & IDDSCFG_ALL) {
For each entry in idds_scalls table
   If IDDSCFG_SET, set selected to 1 and rtnerr to IDDCFG_BOTH
   Else /* IDDCFG_CLEAR */, set selected to 0 and rtnerr to IDDSCFG_NONE
Obtain lock for idds_procselect table Remove any elements in list and set list pointer to NULL Release lock and return
/* Now process actions on specified tokens */
for every token in given token array
  if IDT_SCALL token
    if IDDSCFG_SET
      set the selected field to 1 for the given dat1 scall (or all if ALLTOKEN)
      set the corresponding rtnerr field to the given dat2 value
    else /* IDDSCFG_CLEAR) */
      clear the selected field to 0 for the given dat1 scall (or all if ALLTOKEN)
  else /* idds_procselect related token */
    obtain lock for idds_procselect table
    if all (ALLTOKEN)
      remove any list entries—no entries are required for IDDSCFG_ALL settings
    else walk list looking for token match (given token ==token field)
      if found and IDDSCFG_CLEAR, remove entry from list
      if !found and IDDSCFG_SET, add new entry to list with specified parameters.
Release lock
Set flag to indicate IDDS process configuration table has been updated changed
If IDDS process config table updated
Call new PM access routine (set_all_iddscfg_recalc) to set recalc bit for all processes in the system wide proc table
idds_setup
This routine is called at the start of the system call path to intiailize the per thread selection fields.
This routine is called at the start of the common system call code, syscall( ). If IDDS is started, it updates the per process audit flag, as needed, and the per thread audit flags. These flag settings remain in effect for the duration of the threaded system call.
The per process audit flags are generated from the selection information in the idds_procselect table, but only if the following conditions are met:
1) the IDDS started flag is set to 1,
2) the idds_procselect table was modified since the last setting of the per process IDDS flags, and
3) the per process IDDS flags are not currently set through inheritance (okay if flag inherited but not set).
It is often the case that a process needs to enable IDDS for itself and all its descendents. For instance, this is what is currently done for the login process in legacy audit, in order to audit a particular user. Therefore, the per process flag will not be reset if already set by inheritance from the parent process. If an IDDS flag is inherited, but not set, the flag can be set via the selection information in the idds_procselect table, and the flag is no longer marked as inherited. This allows a child process to be audited, even though it inherited a "disabled" audit setting.

The IDDS per thread selection flags are based on the selection flag in the idds_scall table and the IDDS per process selection flag. If both flags are set, the IDDS thread selection flag (the scall field) is set, enabling data to be collected for an IDDS record.

Pseudo-Code:

```
VASSERT (idds_control.enabled);
/* Update the per process idds flags, if needed
 * - idds started
 * - recalc set
 * - not previously selected (1) through inheritance
 */
iddsperproc = (struct idds_proc_block
*) get_p_audperproc (p);
if (idds_control.started &&
iddsperproc->flags.recalc &&
! (iddsperproc->flags.selected && iddsperproc-
>flags.inherited)) {
    /* REVISIT: Use lock_read( ) ?
     * Obtain iddsperproc lock (for read)
    MP_SPINLOCK(iddsperproc->lock);
    */
    /* Check recalc again under lock */
    if (iddsperproc->flags.recalc) {
        iddsperproc->flags.recalc = 0;
        recalc = 1;
    }
    else
        recalc = 0;
    /* REVISIT: Pair w/ lock routine
     * Release iddsperproc lock
    MP_SPINUNLOCK(iddsperproc->lock);
    */
    /* If still recalc, search for new IDDS process
configs */
    if (recalc) {
        /* REVISIT: Use lock_read( )?
         * Obtain idds_procselect lock (for read)
        MP_SPINLOCK(idds_control.idds_procselect-
>lock);
        */
        /* Check for any matching entries (uids or
gids) */
        ps = &idds_control.idds_procselect;
        if (ps->all)
            found = 1;
        else {
            /* Get current process value to compare.
            /* REVISIT: Need token access function.
             * For now, just hard code in if
statement */
            for (found=0, entry=ps->list; !found &&
entry;
                 entry=entry->next) {
                if (((entry->token_id == IDT_UID) &&
                    (entry->u_dat.uid == p_uid(p))) ||
                   ((entry->token_id == IDT_GID) &&
                    (groupmember(entry->u_dat.gid))))
{
                    found = 1;
                }
            }
        }
        /* REVISIT: Pair w/ lock routine.
         * Release idds_procselect lock (for read)
        MP_SPINUNLOCK (idds_control.idds_procselect-
>lock);
        */
        iddsperproc->flags.selected = found;
    }
}
```

-continued

```
    /* Now calculate the per thread idds flags from the idds system
     * call table and the per process idds flags. NOTE: per thread
     * idds flags are always recalculated at the start of system call.
     * Also, these flags are only set if system-wide IDDS is enabled
     * or "started".
     */
    iddsperthread = t->kt_audperthrd;
    syscall = u.u_syscall;
    selected =
idds_control.idds_scalls[syscall].flags.selected;
    state = idds_control.idds_scalls[syscall].flags.state;
    scallerr = idds_control.idds_scalls[syscall].flags.rtnerr;
    /* Weed out IDDSCFG_NONE rtnerr selections here */
    if (scallerr == IDDSCFG_NONE)
            iddsperthread->flags.scall = 0;
        else
            iddsperthread->flags.scall =
                iddsperproc->flags.selected && selected;
    /* Set the per thread idds state flag if the per thread idds
     * selectin flag is set, or the current system call is a mandatory
     * system call. Note that there's no need to factor in system
     * wide enabled flag since this setting was asserted at the start
     * of the routine.
     */
    iddsperthread->flags.state = (iddsperthread->flags.scall ||
state);
    /* Just copy scall err settings, since we deal with these at
     * end of syscall. They will then be used to adjust selection.
     * Note that this field is meaningless if NONE is selected.
     * However, might as well log it for debugging purposes.
     */
    iddsperthread->flags.rtnerr = scallerr;
}
``` idds_scall

This is a macro intended for individual system call use, before IDDS stubs are called to collect and store IDDS relevant data.

This macro is for individual system call usage. It returns the IDDS per thread flag value for the current thread. This flag does not change once set at the beginning of the system call path, with the exception of adjustments made at the end of the system call, based on the return error.

idds_scallerr

This routine is called at the end of the system call path, prior to calling the IDDS routine to generate an IDDS record for the current system call. This routine evaluates the system call error return value against the specified scallerr filters PASS, FAIL, or BOTH, and updates the IDDS per thread flags accordingly. Any NONE filters were factored into the audit flags at the start of the system call, during idds_setup( ).

Pseudocode:

```
    iddsperthread = t->kt_audperthrd;
    if (((scallerr = iddsperthread->flags.rtnerr) !=
IDDSCFG_BOTH) &&
        ((scallerr==IDDSCFG_PASS && err) ||
         (scallerr==IDDSCFG_FAIL && !err)))
            iddsperthread->flags.scall = 0;
    return iddsperthread->flags.scall;
```

Data Collection Routines

This section describes the routines for collecting and storing path name arguments, deriving the corresponding path names for symbolic links, maintaining the root and current working directories (required for expanding relative pathname arguments to full path names), and deriving full path names given a file descriptor. These routines are called from individual system calls that are required for IDS/DSP 150 support and contain pathname arguments and/or impact files. A subsequent section details how the routines are invoked from the individual system call code.

This section also addresses allocation, initialization, and deallocation of the per-process and per-thread data structures used for data collection.

idds_set_path

This is a macro that is invoked from within individual system calls that process file arguments. The macro is called prior to the point where the path name arguments and associated file information are recorded. The macro sets a flag that informs the internal data collection routines which path name argument (first or second) is currently being processed. This is required since there are dedicated fields pertaining to the first and second path name arguments.

This macro sets the which_path flag in the IDDS per thread structure to the given value X. A value of 0 pertains to the first path name argument, and a value of 1 pertains to the second path name argument. By default, which_path is set to 0. As such, calling this macro is not required prior to processing the first path name argument. However, there are error recovery cases where which_path may be non-zero when the first path argument is processed. Resetting the flag to 0 (idds_set_path(X=0)) is required for such cases.

This macro must be called to set the flag to 1 (idds_set_path(X=1)) prior to processing the second path name argument in such system calls as link( ), symlink( ), mount( ), etc.

idds_vnode_info

This function retrieves IDDS pertinent information from a VFS vnode and stores it in the idds_vnode structure corresponding to a path being processed.

This routine stores the UID and GID of the file owner, the file type, and the device/node ID information associated with the given vnode. It uses the VFS macro, VOP_GETATTER, to extract the details from the underlying file system.

idds_rec_pathname( )

This routine saves the path name arguments into the IDDS per thread structure.

This routine allocates space and copies the given path name into this space. A pointer to the location is saved in the IDDS per thread path name argument field associated with which_path. If a path name is already stored off of the path name argument field, the associate space is deallocated. The corresponding symlink fields in the IDDS per thread data structure are used to store the "derived" path name, where all symbolic links are resolved, if any symbolic links are present in the given path name. The derived path name is recorded in another routine. However, the symlink fields are initialized in this routine.

The idds_rec_pathname( ) routine is called at the start of the existing path name traversal routine, lookuppn( ), which in turn is called from the individual system calls to resolve path names to the corresponding vnode.

idds_rec_symlink

This routine resolves any symbolic links in the given path name and stores the path name off of the IDDS per thread structure.

If a path name argument contains symbolic links, this routine is called to resolve the symbolic links and save the "derived" name into the IDDS per thread symlink field based on which_path. The routine is passed a pointer to the first character in the pathname being translated, a pointer to the first character (either a '/' or '\0') following the component name that corresponds to the symbolic link, the number of unprocessed characters remaining in the pathname, a pointer to a buffer holding the contents of the link (the resolved name of the component), and the number of characters in the link. This routine is called every time a symlink component is detected within a given path name in the path name traversal logic in locallookuppn( ). Hence, this routine can be called multiple times for a single path name. Space is allocated to store the "derived' file name when the idds_rec_symlink( ) routine is first called for a given path name. The first call is detected by looking for initialized values in the symlink fields, which are initialized once per given path name in the idds_rec_pathname( ) routine.

idds_dnlc_pathname

This routine attempts to reconstruct a full path name for a given vnode.

IDDS attempts to report path name information for all accessed files. There are a number of system calls in which a caller doesn't provide the name of file, but performs file access via a file descriptor. File names must then be reconstructed for the corresponding file.

Information available in the directory name lookup cache is used to reconstruct the path name. This design is based on the following premises:

1) The given file was recently opened. Therefore, the path name information is most likely present in dnlc cache (since the corresponding vnodes are cached during the fd resolution to the file's vnode). It may also be that only the lowest path name levels are cached if file accesses are relative to the current directory.

2) The higher directory levels in a path name are accessed very frequently and thus are kept in the cache.

The idds_dnlc_pathname only attempts to reconstruct the path from dnlc cache. It does not attempt to recover path name information from disk. If the entire "full" path name (starting from a root directory) is not cached, the routine reports whatever can be obtained from cache and sets a bit indicating that the path name is incomplete.

Algorithm

From a vnode pointer, the associated ncache entry can be obtained via the vn->v_nachevhd field. From this ncache entry, a pointer to the parent directory node can be obtained. The name associated with a vnode can be obtained from the ncache entries. This process continues until—ideally—we get to the root. At this point, all elements (directories) in the file name can be reconstructed.

1) lock dnlc (in order to extract consistent information from dnlc it must be locked)
2) traverse up the dnlc list until root or last cached entry encountered, saving each dnlc entry pointer
3) starting at the end of the saved list, obtain the name from each dnlc entry and append to path name
4) unlock dnlc Implementation Details idds_Misc_Token_Append This routine appends data to the "generic" data buffer accessed via the IDDS per thread data structure.

This routine is used for complex arguments (strings/ structs that involve a copyin( ) from user space), and computed values that are not stored elsewhere in other kernel locations. This routine allocates space for the given data and stores a pointer to the data along with token and length information in the tokens array in the next available array entry, as specified by the next_token value in the IDDS per thread data structure.

The data in the misc_tokens buffer is later retrieved when an IDDS audit record is generated. The token management routines will scan the misc tokens buffer from 0 . . . next_token-1, looking for tokens that match the needed token.

The syscall return code must traverse the tokens array (0 . . . next_token) and free the malloced memory and initialize the next_token value to zero.

Root and Current Directory Maintenance Modules

The proposed design will attempt to minimize the amount of memory required to store the root and current directory names. Numerous processes (and corresponding threads) will be able to share the same directory name buffers. For proper handling of usage of these buffers, we are going to maintain a reference count. This count will be updated under protection of a special spinlock—idds_dirs_lock. Directory updates are quite rare, so we will be using one system wide global lock. It should be allocated during idds initialization and stored along with the rest of the idds global structures.

Directory Name Initialization for Process 0

The initial (process 0 and associated thread) names of root and current directories are set to '/' in vfs_mountroot( ).

Directory Name Initialization for all Other Processes and Threads

All other processes inherit root and current directory names from the parent process during process creation (newproc( )). Actual values are assigned in fork_inherit( ). The process' and main thread's directory names are set to the parent's directory names. At some point after the call to fork_inherit( ), newproc( ) calls bump_shared_objects( ), which increments the directory name reference counters for root and current directories each by 2, since both process and main thread copies were made. If the fork of a process is unsuccessful, newproc( ) later calls unbump_shared_objects( ), which decrements the directory name reference counters by 2, since both process and thread copies are removed.

When a process creates a new thread, the new thread gets its directory names set to the current process' directory names in thread_create( ). The reference counts are also incremented at this time.

Directory Name Updates

Process root or current directories are changed as a result of one of threads issuing a chroot( ) or chdir( ) system call, respectively. Current directories are also modified as a result of the fchdir( ) system call. These system calls are considered IDDS mandatory system calls, such that IDDS state must always be collected when these calls are executed in order to maintain the proper state of the root and current directory path names.

When a root or current directory is modified, the remaining threads within the same process get their versions of the root and current directories updated in the kthread_shared_objects_update( ) routine when they enter the syscall( ) function.

Root Directory Names

The following steps are performed to update the root directory name during the chroot( ) system call:

chroot( ) goes through a path name resolution when it calls lookuppn( ). This is where the IDDS routines idds_rec_pathname( ) and idds_rec_symlink( ) are invoked to save the path name parameter and the derived path name (if the path name parameter contained any symbolic links) into the corresponding IDDS per thread allocated fields. The derived path name is used to generate the new root directory name, if present. Otherwise, the given path name is used.

The resulting name is then further processed in the idds_build_full_dir_name( ) routine to generate the full path name.

In change_p_rdir( ), the name is then stored in the proc_root_dir field off of the IDDS per process idds_proc_block structure. The name is also stored in kt_root_dir off of the idds_thread_block structure.

Current Directory Names

The current directory is modified as the result of a chdir( ) or fchdir( ) system call.

The following steps are performed to update the current directory name during chdir( ) call. These steps are nearly identical to the steps performed to create the root directory name during chroot:

chdir( ) goes through a path name resolution when it calls lookuppn( ). This is where the IDDS routines idds_rec_pathname( ) and idds_rec_symlink( ) are invoked to save the path name parameter and the derived path name (if the path name parameter contained any symbolic links) into the corresponding IDDS per thread allocated fields. The derived path name is used to generate the new current directory name, if present. Otherwise, the given path name is used.

The resulting name is then further processed in the idds_build_full_dir_name( ) routine to generate the full path name.

In change_p_dir( ), the name is then stored in the proc_current_dir field off of the IDDS per process idds_proc_block structure. The name is also stored in the kt_current_dir off of the idds_thread_block structure.

If a thread issues an fchdir( ) system call to change the current directory, an attempt is made to reconstruct the directory name by utilizing a directory name lookup cache mechanism discussed in section 0, and then proceed with the update as done with a chdir( ) call in the change_p_cdir( ) routine. If reconstruction of the path name fails, the current directory name for a given process is invalidated until another chdir( ) call with a full path name occurs.

Canonical Path Names

The idds_build_full_dir_name( ) builds the directory names based on the path stored in the IDDS per thread block pathname argument field and the root and current directories of the process.

If the new name is absolute, this name is simply appended to the root directory name to form the full directory name. Otherwise, if the combined length of the new name and the current directory is less than the maximum length (IDDS_MAX_ROOT_PATHNAME and IDDS_MAX_CURRENT_PATHNAME, respectively), the current directory and the new name are combined to form the full directory name.

If the newly created directory name is valid, the name is reduced into canonical form. The VVOS implementation used in the reduce utility command (resolve_pathname( ) in reduce.c) is leveraged to produce the canonical form. The name is resolved to canonical form by removing any ".", "..", and consecutive "/" characters from the name.

Directory Name Cleanup

When a thread exits, the reference counts of corresponding shared objects (root and current directory names) are decremented. When a process exits, release_rdir( ) and release_cdir( ) routines are called to decrement the reference counts.

IDDS Stub Routines and Macros

The following routines are called to set the root and current directories for the process and associated threads. In idds_set_prdir( ) and idds_set_pcdir( ), the space in which the names are stored is allocated when the process root and current directory pointers are updated, respectively. In idds_set_trdir( ) and idds_set_tedir( ), the thread root and current directory pointers are updated to point to the previously allocated space. These routines are called during the creation of process 0 and when the root or current directories are modified via chroot, chdir, or fchdir.

IDDS Data Structure Allocation/Deallocation idds_proc_block (IDDS Per Process Data Structure)

The IDDS per process data structure allocation/deallocation designs mirror the logic used to set up the p_shared field in the proc structure.

Allocation/Initialization

When a process is created, the following steps are performed to allocate and initialize the IDDS per process data structure, idds_proc_block. The p_auditperproc field in the proc structure is initialized to point to this new data structure.

The data in the allocated IDDS data structure is copied from the parent process. This is done in fork_inherit( ) (refer to section 0). The p_auditperproc field in the proc structure is also initialized initialized to point to the new data structure in this routine.

Deallocation

When a process terminates, the idds_proc_block must be deallocated. This is performed in the freeproc( ) routine.

idds_thread_block (IDDS Data Block Handling

The IDDS per thread data structure allocation/deallocation designs mirror the logic used to handle the kt_krusagep p_shared field (the per thread resource usage data) in the proc structure. Also, the logic used in handling the existing kt_cdir and kt_rdir fields (the per thread root and current directory vnodes) in the thread structure was leveraged for kt_root_dir and kt_current_dir fields (the per thread root and current directory names) in the idds_thread_block structure.

Allocation/Initialization.

Three cases must be considered when a thread is created:
1) a main thread is created
2) a totally new thread is created a cached thread is reused For the first two cases, a new idds_thread_block must be allocated and the kt_audperthread field in the kthread structure is set. This is done in allocthread( ) routine. No additional data blocks are allocated for the threads.

When a main thread is created, the kt_root_dir and kt_current_dir pointers are initialized from the parent process' (Refer to the fork_inherit( ) discussion in section 0 for more details).

For the other two cases (a new thread is created or the thread is reused from the thread cache), kt_root_dir and kt_current_dir pointers are initialized from the current process' root and current directory name pointers. (Refer to the thread_create( ) discussion in section Error! Reference source not found. for more details).

No other IDDS per thread fields need be initialized since they are set at the beginning of each system call.

Deallocation

When a thread is released, idds_thread_block must be deallocated and the kt_audperthrd pointer is set to NULL. This is done in the link_thread_to_freelist( ) routine.

Per System Call Code

This section outlines what changes need to be made to the individual system calls to support the data collection of IDDS relevant data. The following information is specified for each system call, or group of related system calls:
- what is collected,
- when the data to be collected is valid,
- where it is stored,
- what token is associated with the stored data.

Note that for file related system calls with pathname arguments, if the user specified file is a symlink, and the system call follows symlinks, then the vnode information that is for the target of the symlink, not the symlink vnode itself. This is okay, since nothing in the system checks permission and/or ownership on a symlink, only the target file.

File1 and file2 are shorthand notations for the first and second elements of the IDDS per thread argument_pathname, symbolic_pathname, and vnode_info fields.

open( )/creat( ) files

The following table outlines what data is collected for the open and creat system calls, and where the data is stored for later retrieval by the IDDS subsystem.

| Data to collect | When valid during system call | Where stored | Associated token name |
|---|---|---|---|
| pathname | after name lookup | file1 (name, derived name, vnode info) | IDCT_FILE1 |
| flags | always | u.u_arg[1] | IDT_POFLAG |
| mode | always | u.u_arg[2] | IDT_POMODE |
| umask | always | p_cmask (u.u_procpp) | IDT_UMASK | link( )

The following table outlines what data is collected for the link system call, and where the data is stored for later retrieval by the IDDS subsystem.

| Data to collect | When valid during system call | Where stored | Associated token name |
|---|---|---|---|
| path1 | after name lookup | file1 (name, derived name, vnode info) | IDCT_FILE1 |
| path2 | after name lookup | fil2 (name, derived name only, info is same) | IDCT_FN2 | symlink( )

The following table outlines what data is collected for the symlink system call, and where the data is stored for later retrieval by the IDDS subsystem.

| Data to collect | When valid during system call | Where stored | Associated token name |
|---|---|---|---|
| path1 | after name lookup | file1 given name | IDT_GIVENFN1 |
| path2 | after name lookup | file2 (name, derived name, vnode info) | IDCT_FILE2 |

[1]chmod( ), [1]chown( ), truncate[64]( )

The following table outlines what data is collected for the chmod, 1chmod, chown, 1chown, truncate, and truncate64 system calls, and where the data is stored for later retrieval by the IDDS subsystem.

| Data to collect | When valid during system call | Where stored | Associated token name |
|---|---|---|---|
| path1 | after name lookup | file1 (name, derived name, vnode info) | IDCT_FILE1 |
| mode ([1] chmod only) | always | u.u_arg[1] | IDT_PMODE |
| user ([1] chown only) | always | u.u_arg[1] | IDT_PUSER |
| group([1] chown only) | always | u.u_arg[2] | IDT_PGROUP |
| length (truncate [64]only) | always | u.u_arg[1] | IDT_PLENGTH | fchmod( ), fchown( )

The following table outlines what data is collected for both the fchmod and fchown system calls, and where the data is stored for later retrieval by the IDDS subsystem.

| Data to collect | When valid during system call | Where stored | Associated token name |
|---|---|---|---|
| path1 | after name lookup | file1 (derived name - from dnlc, vnode info) | IDCT_FILE1 |
| mode (fchmod only) | always | u.u_arg[1] | IDT_PMODE |
| user (fchown only) | always | u.u_arg[1] | IDT_PUSER |
| group (fchown only) | always | u.u_arg[2] | IDT_PGROUP | ftruncate[64]( )

The following table outlines what data is collected for both the ftruncate and ftruncate64 system calls, and where the data is stored for later retrieval by the IDDS subsystem.

| Data to collect | When valid during system call | Where stored | Associated token name |
|---|---|---|---|
| Path | after name lookup | file1 (derived name - from dnlc, vnode info) | IDCT_FILE1 |
| Length | always | u.u_arg[1] | IDT_PLENGTH | unlink( ), rmdir( )

The following table outlines what data is collected for both the unlink and rmdir system calls, and where the data is stored for later retrieval by the IDDS subsystem.

| Data to collect | When valid during system call | Where stored | Associated token name |
|---|---|---|---|
| path | after name lookup | file1 (name derived name, vnode info) | IDCT_FILE1 | rename( )

The following table outlines what data is collected for the rename system call, and where the data is stored for later retrieval by the IDDS subsystem.

| Data to collect | When valid during system call | Where stored | Associated token name |
|---|---|---|---|
| path1 | after name lookup | file1 (name, derived name, vnode info) | IDCT_FILE1 |
| path2 | name always valid, vnode info valid if removed a file. | file2 (name, derived name, vnode info if there was a file there before.) | IDCT_FILE2 | stat[64]( )

The following table outlines what data is collected for both the stat and stat64 system calls, and where the data is stored for later retrieval by the IDDS subsystem.

| Data to collect | When valid during system call | Where stored | Associated token name |
|---|---|---|---|
| Path | after name lookup | file1 (name, derived name, vnode info) | IDCT_FILE1 | fstat[64]( )

The following table outlines what data is collected for both the fstat and fstat64 system calls, and where the data is stored for later retrieval by the IDDS subsystem.

| Data to collect | When valid during system call | Where stored | Associated token name |
|---|---|---|---|
| Path | always | file1 (derived name - from dnlc, vnode info) | IDCT_FILE1 | close( )

The following table outlines what data is collected for the close system call, and where the data is stored for later retrieval by the IDDS subsystem.

| Data to collect | When valid during system call | Where stored | Associated token name |
|---|---|---|---|
| Path | always | file1 (derived name - from dnlc, vnode info) | IDCT_FILE1 | mknod( ), mkdir( )

The following table outlines what data is collected for the both the mknod and mkdir system calls, and where the data is stored for later retrieval by the IDDS subsystem.

| Data to collect | When valid during system call | Where stored | Associated token name |
|---|---|---|---|
| Path | after name lookup | file1 (name, derived name, vnode info) | IDCT_FILE1 |
| Mode | always | u.u_arg[1] | IDT_PMODE |
| dev (mknod only) | always | u.u_arg[2] | IDT_PDEV | access( )

The following table outlines what data is collected for the access system call, and where the data is stored for later retrieval by the IDDS subsystem.

| Data to collect | When valid during system call | Where stored | Associated token name |
|---|---|---|---|
| Path | after name lookup | file1 (name, derived name, vnode info) | IDCT_FILE1 |
| Amode | always | u.u_arg[1] | IDT_PMODE | getaccess( )

The following table outlines what data is collected for the access system call, and where the data is stored for later retrieval by the IDDS subsystem.

| Data to collect | When valid during system call | Where stored | Associated token name |
|---|---|---|---|
| Path | after name lookup | file1 (name, derived name, vnode info) | IDCT_FILE1 |
| Credentials | after cred validation | misc tokens buffer off of per thread structure | IDCT_GIDLIST | umask( )

The following table outlines the data required for the umask system call.

| Data to collect | When valid during system call | Where stored | Associated token name |
|---|---|---|---|
| Mask | always | u.u_arg[0] | IDT_PUMASK | lockf( )

The following table outlines what data is collected for the lockf system call, and where the data is stored for later retrieval by the IDDS subsystem.

| Data to collect | When valid during system call | Where stored | Associated token name |
|---|---|---|---|
| path | always | file1 (derived name - from dnlc, vnode info | IDCT_FILE1 |
| function | always | u.u_arg[1] | IDT_PFUNCTION |
| size | always | u.u_arg[2] | IDT_PSIZE | fcntl( )

The following table outlines what data is collected for the fcntl system call, and where the data is stored for later retrieval by the IDDS subsystem.

| Data to collect | When valid during system call | Where stored | Associated token name |
|---|---|---|---|
| path | always | file1 (derived name - from dnlc), vnode info | IDCT_FILE1 |
| cmd | always | u.u_arg[1] | IDT_PCMD |
| lockdes (for lock related cmd arguments) | for lock functions | misc tokens buffer off of per thread structure | IDT_PFLOCK | acl( ), setacl( ), fsetacl( )

The following table outlines what data is collected for the ad related system calls, and where the data is stored for later retrieval by the IDDS subsystem.

| Data to collect | When valid during system call | Where stored | Associated token name |
|---|---|---|---|
| path | after name lookup | file1 (name, derived name, vnode info) | IDCT_FILE1 |
| acl | ACL_SET command | misc tokens buffer off of per thread structure | IDT_PACL |
| nentries ([f]setacl only) | always | u.u_arg[1] | IDT_PNENTRIES | mount( ), vfsmount( )

The following table outlines what data is collected for the mount related system calls, and where the data is stored for later retrieval by the IDDS subsystem.

| Data to collect | When valid during system call | Where stored | Associated token name |
|---|---|---|---|
| fs | always | misc tokens buffer off of per thread structure (copyinstr (u.u_arg[0]) used to store value) | IDT_PFS |
| path | always | file1 (name, derived name, vnode info) | IDCT_FILE1 |
| mflag | always | u.u_arg[2] | IDT_PMFLAG |
| data at dataptr | mflag& MS_DATA!=0 | misc tokens buffer off of per thread structure (copyin from u.u_arg[4] for length u.u_arg[5], may be 0) | IDT_PMDATA | fattach( )

The following table outlines what data is collected for the fattach system call, and where the data is stored for later retrieval by the IDDS subsystem.

| Data to collect | When valid during system call | Where stored | Associated token name |
|---|---|---|---|
| file | always | misc tokens buffer off of per thread structure | IDT_PFS |
| path | always | file1 (name, derived name, vnode info) (copyinstr (u.u_arg[0]) used to store value) | IDCT_FILE1 | fdetach( )

The following table outlines what data is collected for the fdetach system call, and where the data is stored for later retrieval by the IDDS subsystem.

| Data to collect | When valid during system call | Where stored | Associated token name |
|---|---|---|---|
| path | always | file1 (name, derived name, vnode info) | IDCT_FILE1 | modload( )

The following table outlines what data is collected for the modload system call, and where the data is stored for later retrieval by the IDDS subsystem.

| Data to collect | When valid during system call | Where stored | Associated token name |
|---|---|---|---|
| pathname | after name lookup | file1 (name, derived name, vnode info) | IDCT_FILE1 | moduload( )

The following table outlines what data is collected for the modload system call, and where the data is stored for later retrieval by the IDDS subsystem.

| Data to collect | When valid during system call | Where stored | Associated token name |
|---|---|---|---|
| module_id | always | u.u_arg[0] | IDT_PMODULE_ID |

There's no special IDDS logging code associated with this call.

modpath( )

The following table outlines what data is collected for the modload system call, and where the data is stored for later retrieval by the IDDS subsystem.

| Data to collect | When valid during system call | Where stored | Associated token name |
|---|---|---|---|
| pathname | always | misc tokens buffer off of per thread structure | IDT_PMODPATH | setuid( )

The following table outlines what data is collected for the setuid system call, and where the data is stored for later retrieval by the IDDS subsystem.

| Data to collect | When valid during system call | Where stored | Associated token name |
|---|---|---|---|
| uid | always | u.u_arg[0] | IDT_PRUID |
| old uids | after pcred_lock( ) call | misc tokens buffer off of per thread structure | IDT_OLDUID | setgid( )

The following table outlines what data is collected for the setgid system call, and where the data is stored for later retrieval by the IDDS subsystem.

| Data to collect | When valid during system call | Where stored | Associated token name |
|---|---|---|---|
| Gid | always | u.u_arg[0] | IDT_PRGID |
| old gids | after pcred_lock( ) call | misc tokens buffer off of per thread structure | IDT_OLDGID | setresuid( )

The following table outlines what data is collected for the setresuid system call, and where the data is stored for later retrieval by the IDDS subsystem.

| Data to collect | When valid during system call | Where stored | Associated token name |
|---|---|---|---|
| ruid | always | u.u_arg[0] | IDT_PRUID |
| euid | always | u.u_arg[1] | IDT_PEUID |
| suid | always | u.u_arg[2] | IDT_PSUID |
| old uids | after pcred_lock( ) call | misc tokens buffer off of per thread structure | IDT_OLDUID | setresgid( )

The following table outlines what data is collected for the setresgid system call, and where the data is stored for later retrieval by the IDDS subsystem.

| Data to collect | When valid during system call | Where stored | Associated token name |
|---|---|---|---|
| rgid | always | u.u_arg[0] | IDT_PRGID |
| egid | always | u.u_arg[1] | IDT_PEGID |
| sgid | always | u.u_arg[2] | IDT_PSGID |
| old gids | after pcred_lock( ) call | misc tokens buffer off of per thread structure | IDT_OLDGID | setregid( )

The following table outlines what data is collected for the setregid system call, and where the data is stored for later retrieval by the IDDS subsystem.

| Data to collect | When valid during system call | Where stored | Associated token name |
|---|---|---|---|
| rgid | always | u.u_arg[0] | IDT_PRGID |
| egid | always | u.u_arg[1] | IDT_PEGID |
| old gids | after pcred_lock( ) call | misc tokens buffer off of per thread structure | IDT_OLDGID | setgroups( )

The following table outlines what data is collected for the setgroups system call, and where the data is stored for later retrieval by the IDDS subsystem.

| Data to collect | When valid during system call | Where stored | Associated token name |
|---|---|---|---|
| ngroups | always | u.u_arg[0] | IDT_PNGROUPS |
| gidset | after pcred_lock( ) | misc tokens buffer off of per thread structure | IDT_PGIDSET | stime( )

The following table outlines what data is collected for the stime system call, and where the data is stored for later retrieval by the IDDS subsystem.

| Data to collect | When valid during system call | Where stored | Associated token name |
|---|---|---|---|
| tp | always | misc tokens buffer off of per thread structure | IDT_PTIME | settimeofday( )

The following table outlines what data is collected for the settiemofday system call, and where the data is stored for later retrieval by the IDDS subsystem.

| Data to collect | When valid during system call | Where stored | Associated token name |
|---|---|---|---|
| tp | always | misc tokens buffer off of per thread structure | IDT_PTIME |
| tzp | if not NULL | misc tokens buffer off of per thread structure | IDT_PTZ | clock_settime( )

The following table outlines what data is collected for the clock_settime system call, and where the data is stored for later retrieval by the IDDS subsystem. This is handled in settimeofday1( ) in subr_time.c.

| Data to collect | When valid during system call | Where stored | Associated token name |
|---|---|---|---|
| Tp | clock_id== CLOCK_REALTIME | misc tokens buffer off of per thread structure | IDT_PTIME | adjtime( )

The following table outlines what data is collected for the adjtime system call, and where the data is stored for later retrieval by the IDDS subsystem.

| Data to collect | When valid during system call | Where stored | Associated token name |
|---|---|---|---|
| Value | always | misc tokens buffer off of per thread structure | IDT_PTIME |
| Ovalue | successful return | misc tokens buffer off of per thread structure | IDT_POTIME | execv( ), execve( )

The following table outlines what data is collected for the exec related system calls, and where the data is stored for later retrieval by the IDDS subsystem.

| Data to collect | When valid during system call | Where stored | Associated token name |
|---|---|---|---| exit

The following table outlines what data is collected for the exit system call, and where the data is stored for later retrieval by the IDDS subsystem.

| Data to collect | When valid during system call | Where stored | Associated token name |
|---|---|---|---|
| Actual return value | Always | misc tokens buffer off of per thread structure | IDT_RETURN_VALUE | core (special IDDS logging case)

The following table outlines what data is collected when a core file is generated, and where the data is stored for later retrieval by the IDDS subsystem.

| Data to collect | When valid during system call | Where stored | Associated token name |
|---|---|---|---|
| Path to core | Always | File1 | IDCT_FILE1 |

IDDS Record Generation Module

This section outlines the modules that generate the IDDS record or token stream for a given system call.

idds_gen_record( )

This routine is called at the end of the common system call path if the current thread is selected for IDDS auditing and IDDS has been started. It generates the IDDS record or token stream and places the record into the circular buffer, for later retrieval by the IDDS pseudo-driver.

A token stream is created for the current system call. This routine accesses the IDDS system call table (idds_scalls), the primitve token table (idds_tokens), and the composed token table (idds_comp_tokens) to generate the token stream.

The following pseudo-code describes how the IDDS record or token stream is generated and queued to the circular buffer, which is shared by the IDDS pseudo-driver.
1) IDDS_MAX_REC_SIZ bytes are allocated as a temporary buffer
2) The pointer in the temporary buffer is adjusted to allow for space for the pre-header. The pre-header will contain the total record size and the record timestamp. The total record size and timestamp are updated after all tokens and associated data have been written into the token streams.
3) The record header is written to the temporary buffer.
4) For every token in the idds_syscall's tokens list:
   Token ID is written. Only member tokens are written (those in the idds_scalls entries token list).
   For every primitive token in member token (composed tokens are visited until every primitive token is found)
     If idds_types[idds_tokens[my_token_id].type].size is 0 (denoting a variable length token), calculate the data size and write it (as an unsigned short) into the temporary buffer.
     Copy the value (of length size obtained above) associated with the token to the temporary buffer. (If the getvalue function is NULL, the default getvalue routine is used, otherwise the provided getvalue function is called.)
5) Update audit record size and timestamp in preheader.
6) Queue the token stream in the circular buffer
   Acquire circular buffer 340 lock
   If circular buffer full or circular buffer timeout has occurred (max elapsed time before min buffer count reached)
     Wakeup pseudo-driver pending on read
     Release lock
     Drop record or sleep (waiting for space to free up), depending on idds_control.mode setting.
   Else
   Place token stream in circular buffer
   Release lock
7) Free the temporary buffer.

Special Case: List Token Types:

In order to represent a list of values, such as the list of group ID's, a composed list token is created. This token contains two primitive tokens, the IDT_LIST token and a second token that describes the format of the list data elements. The IDT_LIST token value specifies the number of elements in the list. If this list is part of another composed token, we can avoid creating a new composed id by using these two tokens as composed token's members.

IDDS Records for Dynamic System Calls

New system calls can be loaded into the 11.01 kernel. If the new system call change system objects, compromising the security of the system, IDS/9000 must provide circuits to detect illegal activity involving the use of that system call. This may mean that IDDS data needs to be collected for new system calls.

In order to generate audit records for new system calls (static or dynamic ones) these actions must be taken:
1. Identify what information relevant to security must be included into the audit record.
2. Detect what primitive and composed tokens can be reused for the system call.

3. For the information that is not already gathered by existing primitive tokens, create functions that returns the value of that token.
4. During the dynamic kernel module load, add definitions for:
   New Token Type definitions: (idds_add_type( ))
     token type id in idds_type_id.
     token type name in idds_types.
   New Primitive tokens: (idds_add token( ))
     token id in idds_token_id.
     token in idds_tokens.
   New Composed tokens: (idds_add_comp_token( ))
     composed token id in idds_comp_token_id.
     composed token name in idds_comp_token_name.
     composed token list in idds_comp_tokens.
   The new system call token list: (idds_add_scall_tokens( ))

1.1.1.1 IDDS Record Format

The table below illustrates the contents of a sample IDDS record. In this example, the scenario is:

"User 100 tries to modify /etc/passwd using symlink /tmp/my_pass, exploiting a root setuid program"

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of generating kernel audit data comprising:
  storing system call parameters or data that the system call parameters point to at the beginning of a system call;
  and triggering data delivery at the end of a system call path and generating an audit record and depositing the audit record in a circular buffer, wherein the audit record is a tokenized audit record and tokens of the tokenized audit record are either primitive or composed.

2. The method of claim 1, wherein for each system call that accesses files, storing related file information.

TABLE 15

Sample IDDS record contents

| TOKEN ID | ELEMENTS | VALUE (binary rep) THIS is the contents of the IDDS record! | DESCRIPTION |
| --- | --- | --- | --- |
| IDCT_HEADER | | IDCT_HEADER | /* common header */ |
| | IDT_TS | 12348821 | Syscall timestamp. |
| | IDT_PID | 12345 | Process ID. |
| | IDT_ERR | 0 | Success/failure. |
| | IDT_SCALL | 5 (open) | Syscall number. |
| | IDT_PPID | 12344 | Parent process ID. |
| | IDT_UID | 100 | User id. |
| | IDT_GID | 100 | Groups ids. |
| | IDT_EUID | 0 | Effective user id. |
| | IDT_EGID | 0 | Effective groups id(s). |
| | | 0x01ff | Controlling device number/terminal |
| | | 6 (fd) | Syscall return value1 |
| | | 0 | Syscall return value2 |
| IDT_POFLAG | | IDT_POFLAG | Parameter 2: open/create file option flags |
| | | 2 (O_RDWR) | |
| IDT_UMASK | | IDT_UMASK | Process' umask |
| | | 0777 (octal) | |
| IDCT_FILE | | IDCT_FILE | /* Source File */ |
| | IDT_GIVENFN | "my_pass" | given filename 1 |
| | IDT_DERIVEDFN | "/tmp/my_pass" | derived filename 1 |
| | IDT_FMODE | 0700 | File mode |
| | IDT_FUID | 100 | File uid (owner) |
| | IDT_FGID | 100 | FIle gid (owner) |
| | IDT_FINODE | 12345 | File id (inode, usually) |
| | IDT_FDEV | 0x0345 | File device |
| IDCT_FILE2 (*) | | IDCT_FILE2 | /* Optional: if file ie symlink then target file info */ |
| | IDT_GIVENFN2 | "/etc/passwd" | given filename 2 |
| | IDT_DERIVEDFN2 | "/etc./passwd" | derived filename 2 |
| | IDT_FMODE2 | 0444 | Target File mode |
| | IDT_FUID2 | 0 | Target File uid (owner) |
| | IDT_FGID2 | 0 | Target File gid (owner) |
| | IDT_FINODE2 | 54321 | Target File id (inode, usually) |
| | IDT_FDEV2 | 0x0344 | Target File device |

3. The method of claim 2, wherein related file information includes file owner or group and the file information is stored before any modifications occur that might affect the file information.

4. The method of claim 1, wherein system call parameters that include path name parameters are stored with full path name information.

5. A method of generating kernel audit data comprising:
storing system call parameters or data that the system call parameters point to at the beginning of a system call; and
triggering data delivery at the end of the system call and generating an audit record and depositing the audit record in a circular buffer if, based on the success or failure of the system call, auditing of the system call should continue as specified in a post-call selection flag.

6. The method of claim 5, wherein for each system call that accesses files, storing related file information.

7. The method of claim 6, wherein related file information includes file owner or group and the file information is stored before any modifications occur that might affect the file information.

8. The method of claim 5, wherein system call parameters that include path name parameters are stored with full path name information.

9. The method of claim 8, comprising maintaining root and current directories while threads are in the middle of system call processing.

10. The method of claim 5, further comprising reading audit records from the circular buffer.

11. The method of claim 10, wherein the reading is triggered using a device read call.

12. The method of claim 5, comprising maintaining system wide configuration related data structures and setting selection masks based on such structures for specifying data to be delivered.

13. The method of claim 5, comprising collecting data in the system call path and formatting the collected data into an audit record.

14. The method of claim 13, wherein the collected data is a token stream.

15. The method of claim 13, comprising selecting which data to collect before said collecting step.

16. The method of claim 15, wherein said selecting step can be based on process, user, group, filename information and/or time intervals.

17. The method of claim 15, wherein said selecting step can be based on an outcome of system calls including pass, failure or both.

18. The method of claim 15, comprising configuring which system calls are audited by making ioct1( ) (control) calls on a device driver.

19. The method of claim 5, comprising if the circular buffer is full, then either reading some of the audit records from the circular buffer or dropping new records until space becomes available in the circular buffer.

20. The method of claim 5, further comprising detecting hard link accesses to a critical file.

21. The method of claim 20, comprising maintaining a critical file list for monitoring hard links.

22. The method of claim 5, further comprising presenting delivered data to a user space via a device driver in the kernel.

* * * * *

UNITED STATES PATENT AND TRADEMARK OFFICE
CERTIFICATE OF CORRECTION

PATENT NO. : 7,099,866 B1
APPLICATION NO. : 09/987912
DATED : August 29, 2006
INVENTOR(S) : Mark Crosbie et al.

It is certified that error appears in the above-identified patent and that said Letters Patent is hereby corrected as shown below:

Title Page, Item (75), in "Inventors", in column 1, line 1, delete "San Jos" and insert -- San Jose --, therefor.

In column 18, line 25, after "path_name[2]" insert -- ; --.

In column 22, line 57, delete ""IDCT HEADER"" and insert -- "IDCT_HEADER" --, therefor.

In column 31, line 33, delete "change_p_dir( )" and insert -- change_p_cdir( ) --, therefor.

Signed and Sealed this

Fourth Day of August, 2009

JOHN DOLL
*Acting Director of the United States Patent and Trademark Office*